US012033580B2

(12) United States Patent
Ma

(10) Patent No.: US 12,033,580 B2
(45) Date of Patent: Jul. 9, 2024

(54) DISPLAY PANEL DRIVING METHOD AND DISPLAY PANEL

(71) Applicant: Wuhan Tianma Micro-Electronics Co., Ltd., Wuhan (CN)

(72) Inventor: Xiangwen Ma, Wuhan (CN)

(73) Assignee: Wuhan Tianma Micro-Electronics Co., Ltd., Wuhan (CN)

( * ) Notice: Subject to any disclaimer, the term of this patent is extended or adjusted under 35 U.S.C. 154(b) by 0 days.

(21) Appl. No.: 18/090,281

(22) Filed: Dec. 28, 2022

(65) Prior Publication Data

US 2024/0135884 A1 Apr. 25, 2024

(30) Foreign Application Priority Data

Oct. 24, 2022 (CN) ........................ 202211304697.2

(51) Int. Cl.
*G09G 3/3258* (2016.01)
*G09G 3/3233* (2016.01)

(52) U.S. Cl.
CPC ......... *G09G 3/3258* (2013.01); *G09G 3/3233* (2013.01); *G09G 2300/0819* (2013.01); *G09G 2310/061* (2013.01); *G09G 2310/08* (2013.01); *G09G 2320/043* (2013.01)

(58) Field of Classification Search
CPC ............... G09G 3/3258; G09G 3/3233; G09G 2300/0819; G09G 2310/061; G09G 2310/08; G09G 2320/043
USPC .......................................................... 345/204
See application file for complete search history.

(56) References Cited

U.S. PATENT DOCUMENTS

| | | | | |
|---|---|---|---|---|
| 2003/0107565 A1* | 6/2003 | Libsch | G09G 3/3233 | 345/211 |
| 2006/0244687 A1* | 11/2006 | Fish | G09G 3/3233 | 345/76 |
| 2009/0096725 A1* | 4/2009 | Kretz | G09G 3/3233 | 345/82 |
| 2009/0128534 A1* | 5/2009 | Fish | G09G 3/3233 | 345/82 |
| 2009/0315877 A1* | 12/2009 | Deane | H03K 17/687 | 250/206 |
| 2017/0193923 A1* | 7/2017 | Park | G09G 3/3258 | |
| 2018/0075801 A1* | 3/2018 | Le | G09G 3/3233 | |
| 2019/0114954 A1* | 4/2019 | Xuan | G09G 3/3233 | |

(Continued)

FOREIGN PATENT DOCUMENTS

CN 111369949 A 7/2020

*Primary Examiner* — Tom V Sheng
(74) *Attorney, Agent, or Firm* — Anova Law Group, PLLC

(57) ABSTRACT

A display panel including a first pulse width modulation period and a second pulse width modulation period, in the first pulse width modulation period, a duty cycle of a light-emitting control signal in a light-emitting stage being a first duty cycle, in the second pulse width modulation period, the duty cycle of the light-emitting control signal in the light-emitting stage being a second duty cycle, the first duty cycle being greater than the second duty cycle, in the first pulse width modulation period, a time interval between the start time of the first reset stage and the start time of the data writing stage being t1, in the second pulse width modulation period, the time interval between the start time of the first reset stage and the start time of the data writing stage being t1, t1<t2.

20 Claims, 16 Drawing Sheets

(56) References Cited

U.S. PATENT DOCUMENTS

| | | | | |
|---|---|---|---|---|
| 2019/0371237 | A1* | 12/2019 | Qian | G09G 3/3266 |
| 2020/0357332 | A1* | 11/2020 | Hung | G09G 3/3233 |
| 2021/0398482 | A1* | 12/2021 | Wang | G09G 3/3233 |
| 2022/0101783 | A1* | 3/2022 | Han | G09G 3/32 |
| 2022/0157240 | A1* | 5/2022 | Furukawa | G09G 3/2096 |
| 2022/0335897 | A1* | 10/2022 | Lai | G09G 3/3258 |

* cited by examiner

DISPLAY PANEL DRIVING METHOD AND DISPLAY PANEL

CROSS-REFERENCE TO RELATED APPLICATIONS

This application claims the priority of a Chinese patent application filed to the State Intellectual Property Office of China on Oct. 24, 2022 with the Application Number of 202211304697.2 and the invention titled "Display Panel Driving Method and Display Panel", the entire content of which is incorporated herein by reference.

TECHNICAL FIELD

The present disclosure relates to the field of display technology and, more specifically, to a display panel driving method and a display panel.

BACKGROUND

Organic light-emitting display devices have the advantages of self-luminescence, low driving voltage, high luminous efficiency, fast response speed, compactness, and high contrast ratio, and are considered to be the next-generation display devices. Organic light-emitting display devices are being widely used in other display devices with display functions such as mobile phones, computers, televisions, vehicle display devices, and wearable devices.

A pixel in an organic light-emitting display device includes a pixel driving circuit. A driving transistor in the pixel driving circuit can generate a driving current, and a light-emitting element can emit light in response to the driving current. The driving current generated by the driving transistor is related to the potential of the gate of the driving transistor. Due to the characteristics of the driving transistor itself, during the screen switching process of the display device, the driving transistor will be affected by the image data of the previous frame, and the display screen cannot be quickly switched to the preset screen, which causes a smear phenomenon and affects the display effect of the display device. In particular, during high-frequency display, the refresh rate is relatively fast, and the smear phenomenon is more prominent.

SUMMARY

One aspect of the present disclosure provides a display panel driving method. The display panel includes a plurality of sub-pixels and a plurality of pixel driving circuits correspondingly connected to the plurality of sub-pixels. The pixel driving circuit includes a driving transistor. The working stages of the pixel driving circuit including a first reset stage, a data writing stage, and a light-emitting stage. The start time of the data writing stage is located after the start time of the first reset stage and before the start time of the light-emitting stage. The first reset stage is used for at least resetting a gate of the driving transistor. The display panel includes a first pulse width modulation period and a second pulse width modulation period. In the first pulse width modulation period, a duty cycle of a light-emitting control signal in the light-emitting stage is a first duty cycle, in the second pulse width modulation period, the duty cycle of the light-emitting control signal in the light-emitting stage is a second duty cycle, the first duty cycle being greater than the second duty cycle. In the first pulse width modulation period, a time interval between the start time of the first reset stage and the start time of the data writing stage is t1, and in the second pulse width modulation period, the time interval between the start time of the first reset stage and the start time of the data writing stage is t1, t1<t2.

Another aspect of the present disclosure provides a display panel. The display panel includes a plurality of sub-pixels and a plurality of pixel driving circuits correspondingly connected to the plurality of sub-pixels. The pixel driving circuit includes a driving transistor. The working stages of the pixel driving circuit includes a first reset stage, a data writing stage, and a light-emitting stage. The start time of the data writing stage is located after the start time of the first reset stage and before the start time of the light-emitting stage. The first reset stage is used for at least resetting a gate of the driving transistor. The display panel includes a first pulse width modulation period and a second pulse width modulation period. In the first pulse width modulation period, a duty cycle of a light-emitting control signal in the light-emitting stage being a first duty cycle, and in the second pulse width modulation period, the duty cycle of the light-emitting control signal in the light-emitting stage is a second duty cycle, the first duty cycle being greater than the second duty cycle. In the first pulse width modulation period, a time interval between the start time of the first reset stage and the start time of the data writing stage is t1; in the second pulse width modulation period, the time interval between the start time of the first reset stage and the start time of the data writing stage is t1, t1<t2.

Compared with the conventional technology, in the display panel driving and the display panel provided by the embodiments of the present disclosure, the working stages of the pixel driving circuit includes the first reset stage, the data writing stage, and the light-emitting stage. The first reset stage is used to reset the gate of the driving transistor in the pixel driving circuit. The display panel includes two pulse periods with different duty cycles, and the first duty cycle corresponding to the first pulse width modulation period is greater than the second duty cycle corresponding to the second pulse width modulation period. At this time, the time interval t2 between the start time of the first reset stage and the start time of the data writing stage under the second pulse width modulation period can be set to be greater than the time interval t1 between the start time of the first reset stage and the start time of the data writing stage under the first pulse width modulation period, which is equivalent to extending the time period between the first reset stage and the data writing stage under the second pulse width modulation period with the low duty cycle. Since the time period between the start time of the first reset stage and the start time of the data writing stage is the process of resetting the gate of the driving transistor, that is, the process of threshold compensation and characteristic recovery of the driving transistor. When this time period is extended, it is equivalent to extending the threshold compensation time and the characteristics recovery time of the driving transistor. The longer the threshold compensation time and the characteristic recovery time is, the more beneficial it is to recover the characteristics of the driving transistor to the initial state, thereby improving the smear phenomenon caused by the failure of a complete characteristic recovery of the driving transistor, and improving the overall display effect of the display panel, which is beneficial to improving the overall display effect of the display panel.

BRIEF DESCRIPTION OF THE DRAWINGS

In order to illustrate the technical solutions in accordance with the embodiments of the present disclosure more clearly, the accompanying drawings to be used for describing the embodiments are introduced briefly in the following. It is apparent that the accompanying drawings in the following description are only some embodiments of the present disclosure. Persons of ordinary skill in the art can obtain other accompanying drawings in accordance with the accompanying drawings without any creative efforts.

DETAILED DESCRIPTION OF THE EMBODIMENTS

Figure 1:
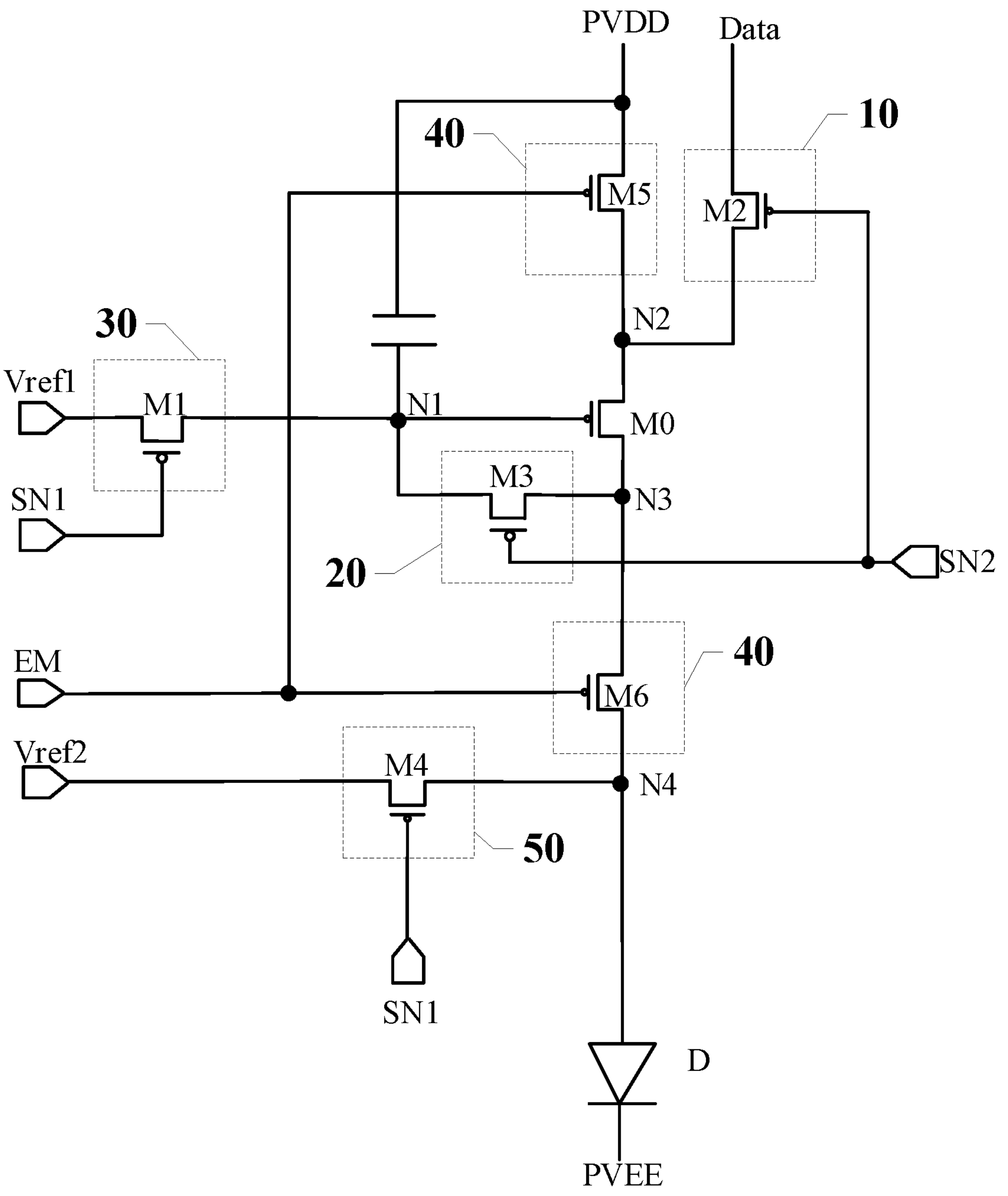
FIG. 1 is a schematic structural diagram of a pixel driving circuit in a display panel according to an embodiment of the present disclosure.

Various exemplary embodiments of the present disclosure are described in detail with reference to the drawings. It should be noted that relative arrangement of components and steps, numerical expressions and values clarified in the embodiments are not intended to limit the scope of the present disclosure, unless otherwise specified.

The following description of the at least one exemplary embodiment is merely illustrative and shall not be constructed as any limitation on the present disclosure and its application or use.

Techniques, methods and apparatus known to those skilled in the art may not be discussed in detail, but the techniques, methods and apparatus should be considered as a part of the specification where appropriate.

In all of the examples shown and discussed herein, any specific values are to be construed as illustrative only rather than limitation. Thus, different values may be used in other examples of the exemplary embodiments.

It is apparent for those skilled in the art that various modifications and variations may be made in the present application without departing from the spirit or scope of the present application. Accordingly, the present application is intended to cover modifications and variations of the present application that fall within the scope of the appended claims (the claimed technical solutions) and their equivalents. It should be noted that the embodiments of the present application, if not in contradiction, may be combined with one another.

It should be noted that similar reference numerals and letters indicate similar items in the following drawings. Therefore, once an item is defined in one drawing, the item is unnecessary to be further discussed in subsequent drawings.

In related art, the brightness of the display panel in the first frame is low, and during the screen switching process, due to the hysteresis effect of the driving transistor itself, the driving transistor will be affected by the image data of the previous frame. As a result, the threshold value of the driving transistor cannot be well-recovered at the light-emitting time of the current frame, such that the driving current corresponding to the preset switching screen cannot be generated, and the display screen cannot be quickly switched to the preset switching screen. For example, assume that the previous frame displays text, and the corresponding position of the text is black, and the other positions are white. In the current frame, assume that the position of the text has changed and moved to another position, the position corresponding to the text in the previous frame needs to display a white screen. Therefore, when the previous frame is switched to the current frame, the position corresponding to the text in the previous frame is in the process of switching from the black screen to the white screen, and at least part of the position corresponding to the non-text in the previous frame is in the process of switching from the white screen to the white screen. Due to the hysteresis effect of the driving transistor itself, the position corresponding to the text in the previous frame will be affected by the image data of the previous frame in the current frame, resulting in a gray screen between the black screen and the white screen when switching from the black screen to the white image. Therefore, in the current frame, the white screen of the position corresponding to the text in the previous frame and the position corresponding to the non-text are not the same, and there will be afterimage at the position corresponding to the previous frame of text, and there will be a smear phenomenon during the continuous multi-frame sliding process, which will affect the display effect. At present, high-frequency display products are becoming more and more popular. As the frequency increases, the time for the threshold recovery of the driving transistor is corresponding shortened. Further, under different duty cycles, the time for threshold recovery of the driving transistor is the same. For example, in the low gray scale (e.g., 2 nit) display mode, the driving current is relatively low. When the duty cycle is reduced, the time required to charge the light-emitting element will be longer, and the recovery time of the driving transistor characteristics will be shorter, such that the smear phenomenon will be more prominent.

In view of the foregoing, embodiment of the present disclosure provides a driving method. The display panel may include a plurality of sub-pixels and a pixel driving circuit correspondingly connected to the plurality of sub-pixels, and the pixel driving circuit may include a driving transistor. The working stage of the pixel driving circuit may include a first reset stage, a data writing stage, and a light-emitting stage, where the start time of the data writing stage may be located after the start time of the first reset stage and before the start time of the light-emitting stage, and the first reset stage may be at least used to reset the gate of the driving transistor. The display panel may include a first pulse period (e.g., a first pulse width modulation period) and a second pulse period (e.g., a second pulse width modulation period). In the first pulse period, the duty cycle of the light-emitting control signal in the light-emitting stage may be the first duty cycle. In the second pulse period, the duty cycle of the light-emitting control signal in the light-emitting stage may be the second duty cycle, and the first duty cycle may be greater than the second duty cycle. In the first pulse period, the interval between the stating time of the first reset stage and the start time of the data writing stage may be t1. In the second pulse period, the interval between the starting tie of the first reset stage and the start time of the data writing stage may be t2, and t1<t2. By extending the time for threshold compensation and characteristics recovery of the driving transistor in the second pulse period with a relatively low duty cycle, the smear phenomenon in the case of low duty cycle can be improved, thereby improving the display effect.

The foregoing describes the core concept of this application. The technical solutions in the embodiments of the disclosure will be described clearly and fully below in conjunction with the accompanying drawings in. All other embodiments obtained by those skilled in the art based on the embodiments in the disclosure without creative efforts shall fall within the protection scope of the present disclosure.

Figure 2:
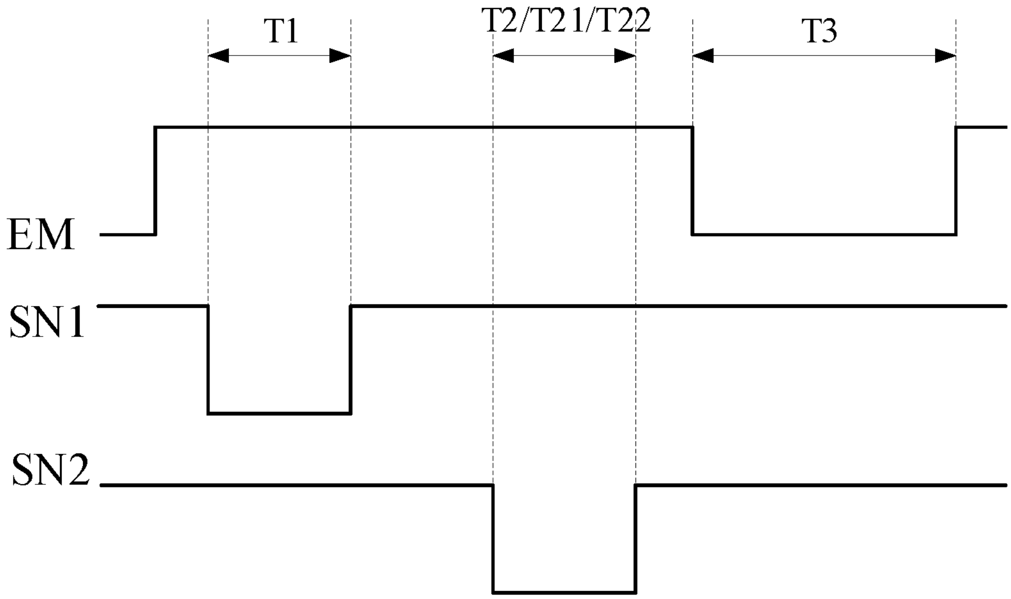
FIG. 2 is a timing diagram of a display panel driving method according to an embodiment of the present disclosure.

FIG. 1 is a schematic structural diagram of a pixel driving circuit in a display panel according to an embodiment of the present disclosure. It should be noted that FIG. 1 is an example, and does not limit the structure of the pixel driving circuit included in the display panel. In some other embodiments of the present disclosure, the pixel driving circuit may also be realized in other structures. The pixel driving circuit includes one driving transistor M0 and six switching transistors M1-M6. In some embodiments, other than the driving transistor M0, the rest of the transistors may be switching transistors. The gate of the driving transistor M0 is connected to a first node N1, the first electrode of the driving transistor M0 is connected to a second node N2, and the second electrode is connected to a third node N3. A first transistor M1 in a first reset module 30 is connected to the gate of the driving transistor M0, and the gate of the first transistor M1 in the first reset module 30 is connected to a first control line SN1. The two electrodes of a second transistor M2 in a data writing module 10 are respectively connected to a data line Data and the second node N2, and the gate of the second transistor M2 in the data writing module 10 is connected to a second control signal line SN2. The two electrodes of a fifth transistor M5 in a light-emitting control module 40 are respective connected to a first power supply signal line PVDD and a second node N2, and the gate of the fifth transistor M5 is connected to a light-emitting control signal line EM. FIG. 2 is a timing diagram of a display panel driving method according to an embodiment of the present disclosure. As shown in FIG. 2, during one frame, the display panel includes a first reset stage T1, a data writing stage T2, and a light-emitting stage T3. In the first reset stage T1, the gate of the driving transistor M0 may be reset, and the threshold value of the driving transistor M0 may be compensated. In the data writing stage T2, data signal may be written into the driving transistor M0. In the light-emitting stage T3, a light-emitting element D may emit light in response to the driving signal of the driving transistor M0.

Figure 3:
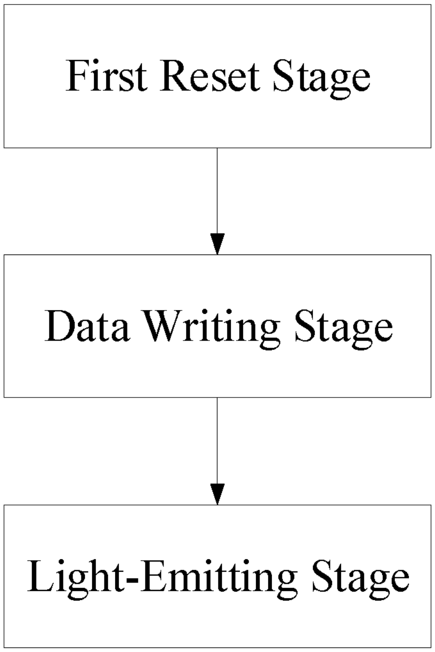
FIG. 3 is a flowchart of the display panel driving method according to an embodiment of the present disclosure.
Figure 4:
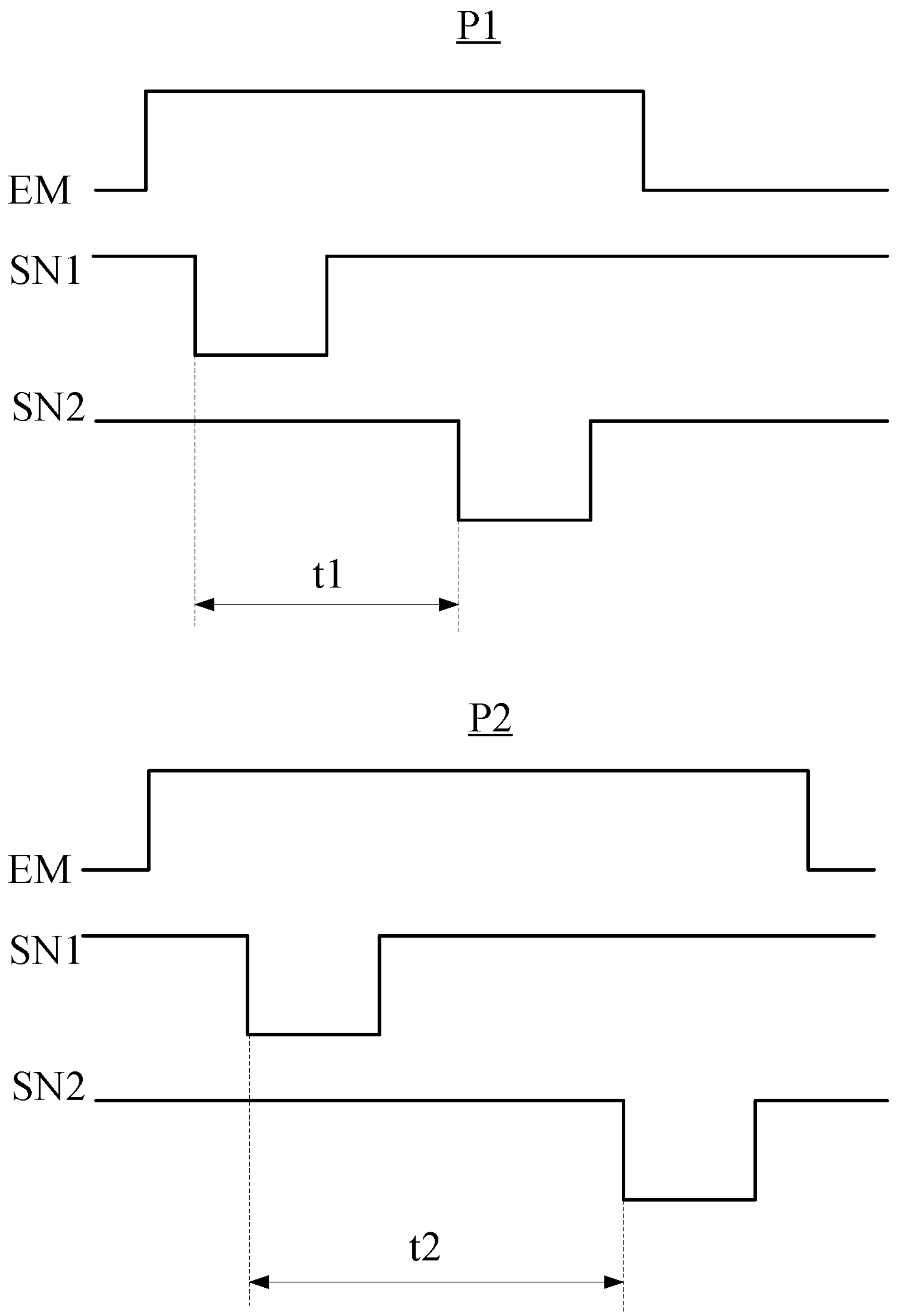
FIG. 4 is a timing comparison diagram under a first pulse period and a second pulse period.

FIG. 3 is a flowchart of the display panel driving method according to an embodiment of the present disclosure. It should be noted that the flowchart of the embodiment shown in FIG. 3 only represents the sequence relationship of the start time of the three stages, namely the first reset stage T1, the data writing stage T2, and the light-emitting stage T3. FIG. 4 is a timing comparison diagram under a first pulse period and a second pulse period. Refer to FIG. 1 to FIG. 4, embodiments of the present disclosure provide a display panel driving method. The display panel may include a plurality of sub-pixels and a pixel driving circuit correspondingly connected to the plurality of sub-pixels. In some embodiments, the pixel driving circuit may be the pixel driving circuit shown in FIG. 1. The pixel driving circuit may include a driving transistor M0, and the working stage of the pixel driving circuit may include a first reset stage T1, a data writing stage T2, and a light-emitting stage T3. In some embodiments, the start time of the data writing stage T2 may be located after the start time of the first reset stage T1 and before the start time of the light-emitting stage T3, and the first reset stage T1 may be at least used to reset the gate of the driving transistor M0.

The display panel may include a first pulse period and a second pulse period. In the first pulse period, the duty cycle of the light-emitting control signal line in the light-emitting stage T3 may be the first duty cycle. In the second pulse period, the duty cycle of the light-emitting control signal line in the light-emitting stage T3 may be the second duty cycle, where the first duty cycle may be greater than the second duty cycle.

In the first pulse period, the interval between the start time of the first reset stage T1 and the start time of the data writing stage T2 may be t1. In the second pulse period, the interval between the of the first reset stage T1 and the start time of the data writing stage T2 may be t2, where t1<t2.

Due to the hysteresis effected of the driving transistor itself, if the first reset stage T1 is not introduced before the data writing stage T2, or if the first reset stage T1 is performed before the data writing stage T2 for a relatively short period of time, the characteristics of the driving transistor are difficult to recover, and the signal of the previous frame will affect the display of the current frame. In the current frame, the image cannot be quickly switched to the current image, resulting in the phenomenon of display smear and affecting the display result.

The larger the driving transistor of the pulse period of the display panel, the shorter the time period between the start time of the first reset stage T1 and the end time of the data writing stage T2 in the same pulse cycle; and smaller than the driving transistor of the pulse period, the longer the time period between the of the first reset stage T1 and the end time of the data writing stage T2 in the same pulse period. In the related art, under different duty cycles, the time interval between the first reset stage T1 and the data writing stage T2 is the same. That is, the time for threshold recovery of the driving transistor is also the same, which results in the same threshold recovery time being used at low duty cycle and at high duty cycle, resulting in more prominent smear phenomenon at low grey scale and low duty cycle. Therefore, in the display panel driving method provided by the embodiments of the present disclosure, the second duty cycle corresponding to the second pulse period of the display panel may be smaller than the first duty cycle corresponding to the first pulse period. In the present disclosure, the interval t2 between the start time of the first reset stage T1 and the start time of the data writing stage T2 under the second pulse period may be set to be greater than the interval t1 between the start time of the first reset stage T1 and the start time of the data writing stage T2 under the first pulse period. In this way, the time period between the first reset stage T1 and the data writing stage T2 can be extended under the second pulse period with a relatively low duty cycle. Since the process of resetting the gate of the driving transistor, that is, the process of threshold compensation and characteristics recovery of the driving transistor, occurs in the time period between the start time of the first reset stage T1 and the start time of the data writing stage T2. When this time period is extended, it is equivalent to extending the characteristics recovery time of the driving transistor. The longer the threshold compensation time is, the more beneficial it is to recover the characteristics of the driving transistor to the initial state, thereby improving the smear phenomenon caused by the failure of a complete characteristic recovery of the driving transistor, and improving the overall display effect of the display panel. In the present disclosure, the length of the interval between the start time of the first reset stage T1 and the start time of the data writing stage T2 may be set differently based on the pulse periods of different duty cycles. The time interval between the first reset stage and the data writing stage at low duty cycle can be extended, thereby extending the characteristics recovery time of the driving transistor at low duty cycle. In this way, the characteristics of the driving transistor can be better recovered before the light-emitting stage T3 under the pulse periods with different duty cycles, which effectively improves the smear phenomenon caused by the failure of a complete characteristics recovery of the driving transistor at low gray scale and low duty cycle, which is beneficial to improve the display quality of the display panel under the pulse periods of different duty cycles.

It should be noted that FIG. 4 only shows the timing diagrams corresponding to two pulse periods with different duty cycles, and does not limit the types of pulse periods actually included in the display panel. In fact, the display panel may further include three or more pulse periods with different duty cycles. If the interval between the first reset stage and the data writing stage is the same in pulse periods with different duty cycles and both are reset based on the interval with a relatively long duty cycle, the characteristics recovery time of the driving transistor will be shorter under the pulse period with a relatively low duty cycle. In the case of low duty cycle and low gray scale, the driving current is relatively small and the time for charging the light-emitting element is relatively long, the smear phenomenon during the screen switching process is more prominent. If the threshold recovery time of the driving transistor is relatively short at low gray scale, the smear phenomenon will be more severe. Therefore, in the embodiments of the present disclosure, the duration between the start time of the first reset stage T1 and the start time of the data writing stage T2 is relatively long in the pulse period with a relatively low duty cycle to extend the threshold recovery time of the driving transistor under low duty cycle, thereby improving the smear phenomenon of the display panel under low duty cycle, and improving the display effect of the display panel under different duty cycles.

Figure 5:
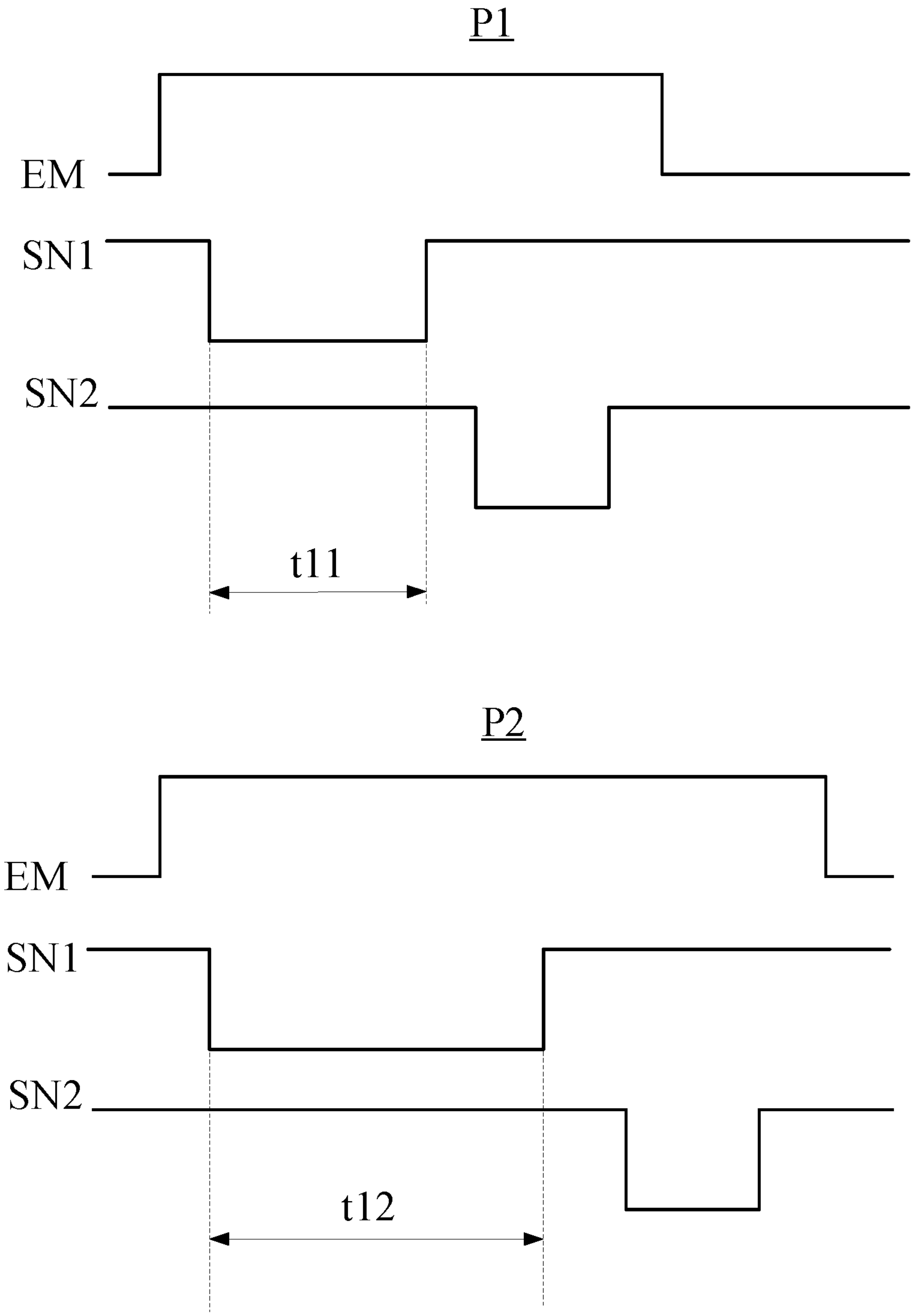
FIG. 5 is another timing comparison diagram under the first pulse period and the second pulse period.

FIG. 5 is another timing comparison diagram under the first pulse period and the second pulse period. Compared with the embodiment shown in FIG. 4, the effective pulse widths corresponding to the signal first reset stage T1 are different. Refer to FIG. 5, under the first pulse period, the effective pulse width corresponding to the single first reset stage T1 is t11; and under the second pulse period, the effective pulse width corresponding to the single first reset stage T1 is t12, where t11<t12.

Refer to FIG. 2 and FIG. 5, since the second duty cycle of the second pulse period is relatively small, the duration t2 from the start time of the first reset stage T1 to the start time of the light-emitting stage T3 under the second pulse period P2 may be greater than the duration t1 from the start time of the first reset stage T1 to the start time of the light-emitting stage T3 under the first pulse period P1. At this time, in this embodiment, the effective pulse width t12 corresponding to the single first reset stage T1 under the second pulse period P2 can be extended to be greater than the effective pulse width t11 corresponding to the single first reset stage T1 under the first pulse period P1. In this way, the time for writing the reset signal to the gate of the driving transistor under the second pulse period P2 with a relatively low duty cycle can be extended, thereby extending the characteristics recovery time of the driving transistor, such that the characteristics of the driving transistor can be better recovered before the light-emitting stage T3, thereby improving the smear phenomenon caused by the failure of a complete characteristics recovery of the driving transistor in conventional technology, and improving the overall display effect of the display panel.

Refer to FIG. 1 and FIG. 2. In some embodiments, the data writing stage T2 may include a compensation stage T21 and a data input stage T22. The compensation stage T21 and the data input stage T22 may be carried out simultaneously, and the start time of the data writing stage T2 may be located after the end time of the first reset stage T1.

More specifically, in this embodiment, the data writing stage T2 includes a compensation stage T21 in addition to the data input stage T22. The threshold voltage of the driving transistor in the compensation stage may be different from the threshold voltage in the light-emitting stage, which will lead to the difference between the actual light-emitting brightness and the target light-emitting brightness. In the compensation stage T21, the driving transistor may be in an on state, and writing a voltage to the first driving node in the compensation stage may be equivalent to performing an on-state bias on the driving transistor, which is beneficial to promote the threshold recovery of the driving transistor, and the influence of the threshold on the brightness current can be eliminated by introducing the compensation stage. Through the cooperation of the first reset stage T1 and the compensation stage T21, reliable recovery of the characteristics of the driving transistor can be realized before the light-emitting stage T3, thereby improving the smear phenomenon. In some embodiments, the compensation stage T21 and the data input stage T22 may be performed at the same time, which not only realizes the threshold compensation of the driving transistor, but also facilitates the simplification of the control sequence.

It should be noted that one of the differences between different pulse periods is the difference in duty cycles. In addition, under different duty cycles, the duration between the start time of the first reset stage T1 and the start time of the data writing stage T2 may be different, but the working stages included in different pulse periods may be the same. For example, in this embodiment, both the first pulse period P1 and the second pulse period P2 include the first reset stage T1, the compensation stage T21, the data input stage T22, and the light-emitting stage T3. In some embodiments, under different pulse periods, the compensation stage T21 and the data input stage T22 may be performed simultaneously.

Refer to FIG. 1. In some embodiments, the driving circuit may include a data writing module 10 and a compensation module 20. The data writing module 10 may be connected to the first electrode of the driving transistor M0, and the compensation module 20 may be connected between the second electrode and the gate of the driving transistor. In the data writing stage T2, the data writing module 10 and the compensation module 20 may be turned on at the same time.

Figure 6:
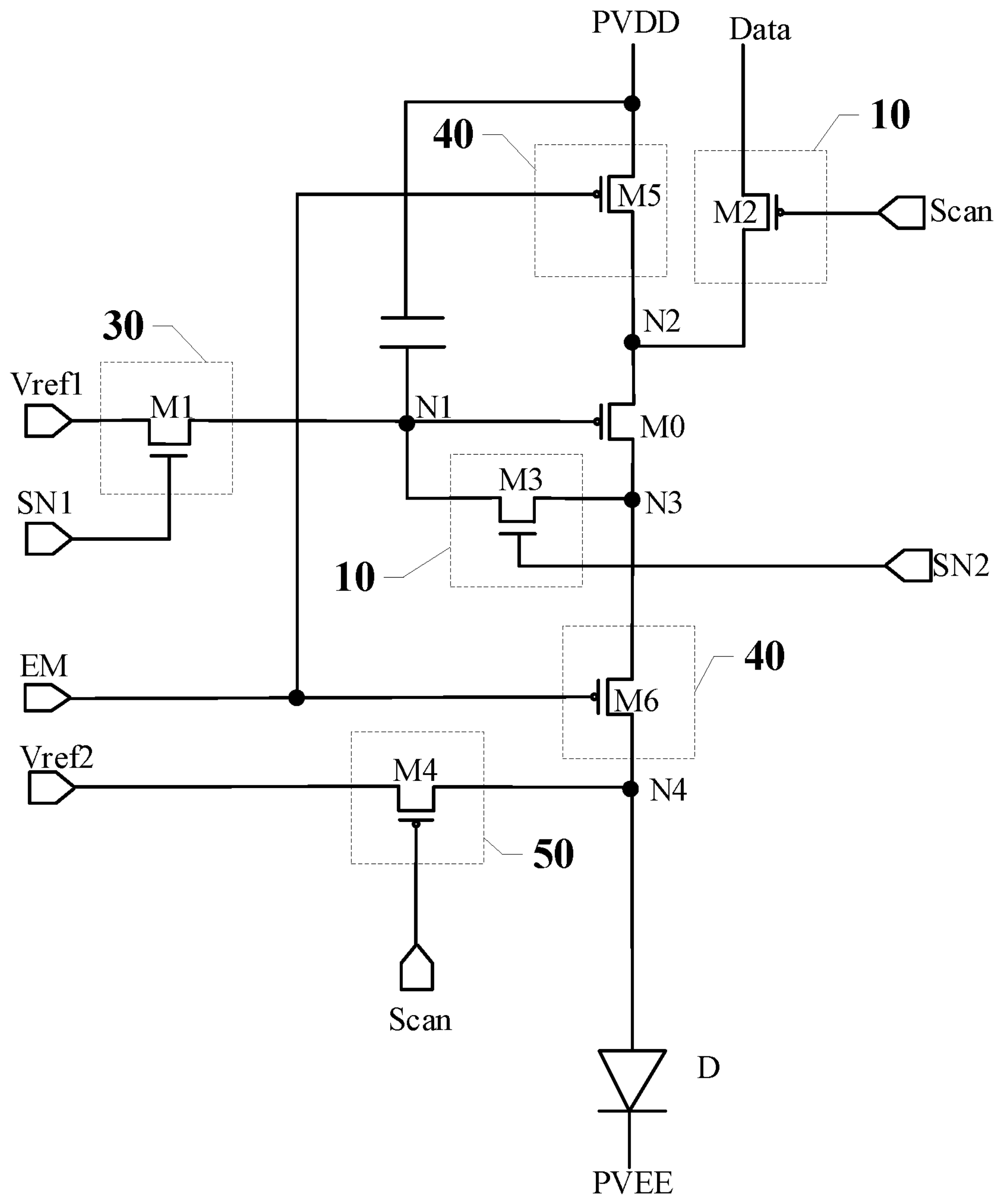
FIG. 6 is another schematic structural diagram of the pixel driving circuit in the display panel according to an embodiment of the present disclosure.

In some embodiments, the two electrodes of the transistor in the compensation module 20 may be respectively connected between the second electrode and the gate of the driving transistor, that is, between the first node N1 and the third node N3 in the pixel driving circuit. It should be noted that FIG. 1 takes the second transistor M2 in the data writing module 10 and the third transistor M3 in the compensation module 20 as the same type of transistors, and the gates of the second transistor M2 and the third transistor M3 being connected to the same second control signal line SN2 as an example for description, but the present disclosure does not limit the type and connection relationship between the second transistor M2 and the third transistor M3. In some other embodiments of the present disclosure, the second transistor M2 in the data writing module 10 and the third transistor M3 in the compensation module 20 may also be different types of transistors, such as the embodiment shown in FIG. 6. In the embodiment shown in FIG. 6, the second transistor M2 in the data writing module 10 is a P-type transistor, the third transistor M3 in the compensation module 20 is an N-type transistor, and the gates of the second transistor M2 and the third transistor M3 are respectively connected to different control lines. For example, the gate of the second transistor M2 is connected to a control line Scan, and the gate of the third transistor M3 is connected to the control signal line SN2. In the compensation stage T21, an on signal can be provided to the transistors in the data writing module 10 and the compensation module 20 through the different control lines described above, and the transistors in the data writing module 10 and the compensation module 20 can be turned on at the same time. FIG. 6 is another schematic structural diagram of the pixel driving circuit in the display panel according to an embodiment of the present disclosure.

In the embodiment shown in FIG. 6, the third transistor M3 in the compensation module 20 is directly connected to the first node N1. The third transistor M3 in the compensation module 20 may be selected as an N-type transistor. Since the leakage current of the N-type transistor is relatively small, it is beneficial to reduce the influence of the leakage current of the transistor connected to the first node N1 on the gate potential of the driving transistor, which is beneficial to the recovery of the characteristic voltage of the driving transistor before the light-emitting stage T3. In some embodiments, the first transistor M1 in the first reset module 30 may also be an N-type transistor to further reduce the leakage current of the gate of the driving transistor through other transistors connected to driving transistor. It should be noted that when the transistors in the first reset module are N-type transistors, in the first reset stage T1, the effective level of the first transistor M1 in the first reset module 30 may be a high level.

Figure 7:
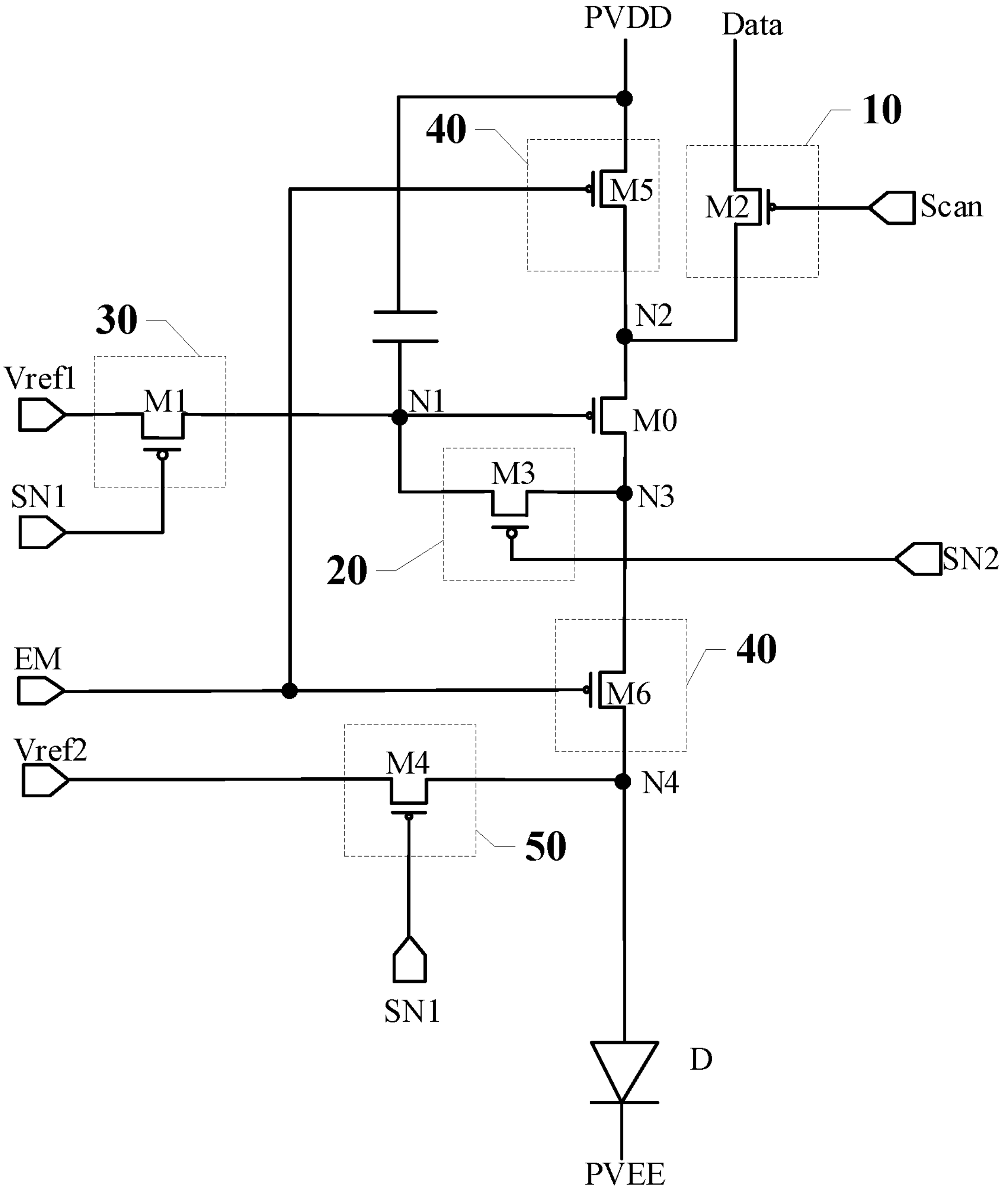
FIG. 7 is another schematic structural diagram of the pixel driving circuit in the display panel according to an embodiment of the present disclosure.
Figure 8:
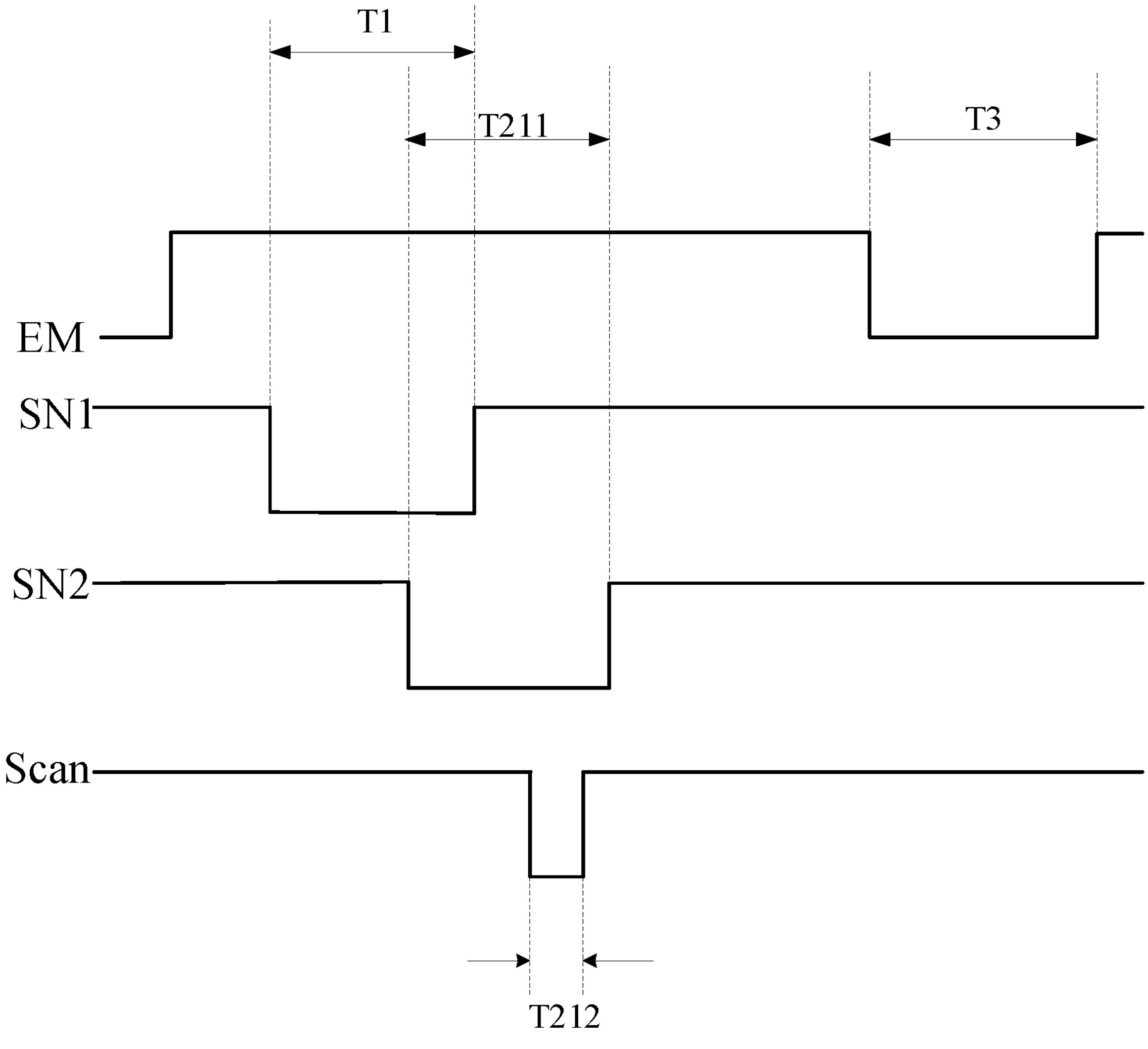
FIG. 8 is a timing diagram corresponding to the pixel driving circuit in FIG. 7.

FIG. 7 is another schematic structural diagram of the pixel driving circuit in the display panel according to an embodiment of the present disclosure, and FIG. 8 is a timing diagram corresponding to the pixel driving circuit in FIG. 7. Refer to FIG. 7 and FIG. 8. In some embodiments, the data writing stage T2 may include a first sub-stage T211 and a second sub-stage T212. The first sub-stage T211 may be used for at least resetting the second electrode of the driving transistor, and the second sub-stage T212 may be used for at least compensating the gate potential of the driving transistor. The start time of the first sub-stage T211 may be located between the start time and the end time of the first reset stage T1, and the end time of the first sub-stage T211 may be located after the end time of the first reset stage T1. The start time of the second sub-stage T212 may be located between the start time and the end time of the first sub-stage T211, and the end time of the second sub-stage T212 may be located after then end time of the first reset stage T1.

More specifically, in the display panel driving method provided by the embodiments of the present disclosure, the data writing stage T2 may further include two sub-stages, respectively a first sub-stage T211 for at least resetting the second electrode of the driving transistor and a second sub-stage T212 for at least compensating the gate of the driving transistor. In some embodiments, the start time of the first sub-stage T211 may be located in the first reset stage T1, that is, the start time of the first sub-stage T211 may be located between the start time and the end time of the first reset stage T1, that is, the first sub-stage T211 and the first reset stage T1 may overlap. During the overlapping period, the reset signal to the first node N1 in the first reset stage T1 may also be provided to the second electrode of the driving transistor through the third node N3 at the same time. The reset signal may reset and compensate the potential of the second electrode of the driving transistor, such that the characteristics of the driving transistor can be recovered as soon as possible. The end time of the first sub-stage T211 may be located after the first reset stage T1, and the first sub-stage T211 located after the first reset stage T1 may also overlap with the second sub-stage T212. During the overlapping period of the first sub-stage T211 and the second sub-stage T212, the data signal may be written into the driving transistor, and at the same time, the gate potential of the driving transistor may be compensated, thereby further improving the recovery of the characteristics of the driving transistor.

It should be noted that one of the differences between different pulse periods is the difference in duty cycles. In addition, under different duty cycles, the duration between the start time of the first reset stage T1 and the start time of the data writing stage T2 may be different, but the working stages included in different pulse periods may be the same. For example, in this embodiment, both the first pulse period P1 and the second pulse period P2 include the first reset stage T1, the first sub-stage T211, the second sub-stage T212, and the light-emitting stage T3. The start time of the first sub-stage T211 may be in the first reset stage T1. Further, the second sub-stage T212 may overlap with the first sub-stage T211, but the second sub-stage T212 may not overlap with the first reset stage T1.

Refer to FIG. 7 and FIG. 8. In some embodiments, the driving circuit may include the data writing module 10 and the compensation module 20. The data writing module 10 may be connected to the first electrode of the driving transistor M0, and the compensation module 20 may be connected between the second electrode and the gate of the driving transistor M0. The control terminals of the data writing module 10 and the compensation module 20 may be respectively connected to different control signal terminals. The compensation module 20 may be turned on in both the first sub-stage T211 and the second sub-stage T212, and the data writing module 10 may be turned on in the second sub-stage T212.

It should be noted that the control terminals of the first reset module 30, the data writing module 10, the compensation module 20, and other modules may refer to the gates of the transistors in these modules. In the embodiments of the present disclosure, the gate of the first transistor M1 in the first reset module 30, the gate of the second transistor M2 in the data writing module 10, and the gate of the third transistor M3 in the compensation module 20 may be respectively connected to different control lines, and the on and off of these modules may be controlled by signals on different control lines. In the first sub-stage T211 in the data writing stage T2, the first reset module 30 and the compensation module 20 may both be in the on state. At this time, the reset signal transmitted by the first reset module 30 can not only be transmitted to the first node N1 of the pixel driving circuit, but can also be transmitted to the third node N3 through the compensation module 20, thereby realizing the reset of the first node N1 and the third node N3, which is beneficial to the recovery of the characteristics of the driving transistor M0. In the second sub-stage T212, the first reset module 30 may be turned off, the compensation module 20 and the data writing module 10 may be turned on, the data signal may be written into the driving transistor M0, and the threshold voltage of the driving transistor M0 may be further compensated by the compensation module 20, such that the characteristics of the driving transistor M0 can be better recovered before the light-emitting stage T3. In addition, considering that the interval from the first reset stage to the light-emitting stage may be different under the first pulse period and the second pulse period of different duty cycles, the leakage time of the first node N1 from the reset voltage provided by the first reset module may be different. When the duty cycle diming is used, the current may deviate from the target current. In the embodiments of the present disclosure, the interval between the start time of the first reset stage and the start time of the data writing stage can be extended under the second pulse period with a relatively low duty cycle, and the on state of the compensation module can be maintained in the first sub-stage T211, the different leakage times can be avoided, such that the actual driving current can be closer to the target driving current, and the actual luminous brightness can be closer to the target luminous brightness, thereby improving the smear phenomenon.

Refer to FIG. 1, FIG. 6, and FIG. 7. In some embodiments, the pixel driving circuit may further include a second reset module 50. The two electrodes of a fourth transistor M4 may be respective connected to a reset signal line Vref2 and a fourth node N4, and the anode of the light-emitting element D may be connected to the fourth node N4. The second reset module 50 may be used to reset the anode of the light-emitting element D. In some embodiments, the signal line connected tot eh anode of the fourth transistor M4 may be the same as any of the control lines connected to the first reset module, the data writing module, or the compensation module, which is not limited in the embodiments of the present disclosure. In some embodiments, the light-emitting control module 40 may further include a sixth transistor M6 connected between the third node N3 and the fourth node N4.

Figure 9:
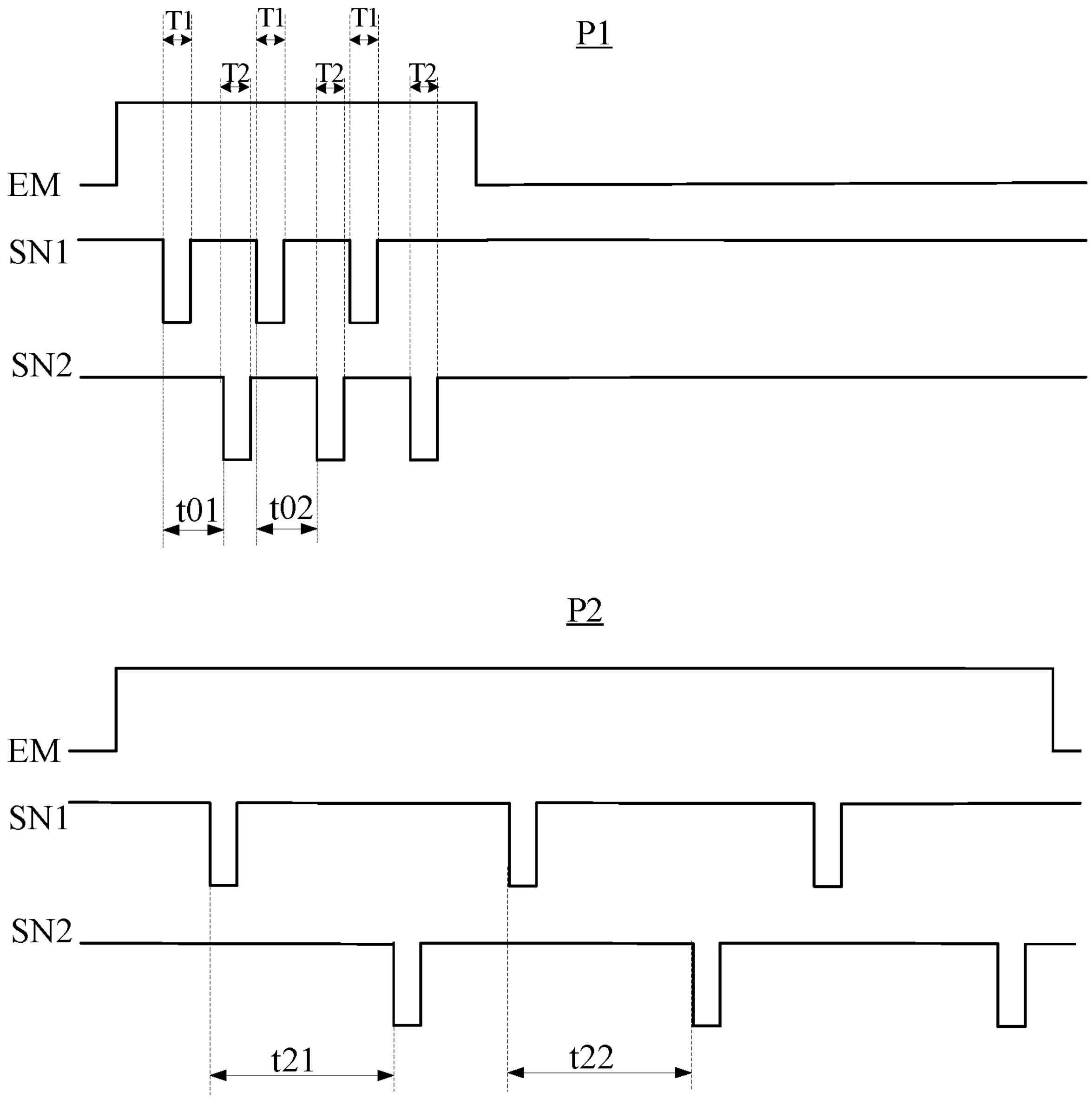
FIG. 9 is another timing comparison diagram under the first pulse period and the second pulse period.
Figure 10:
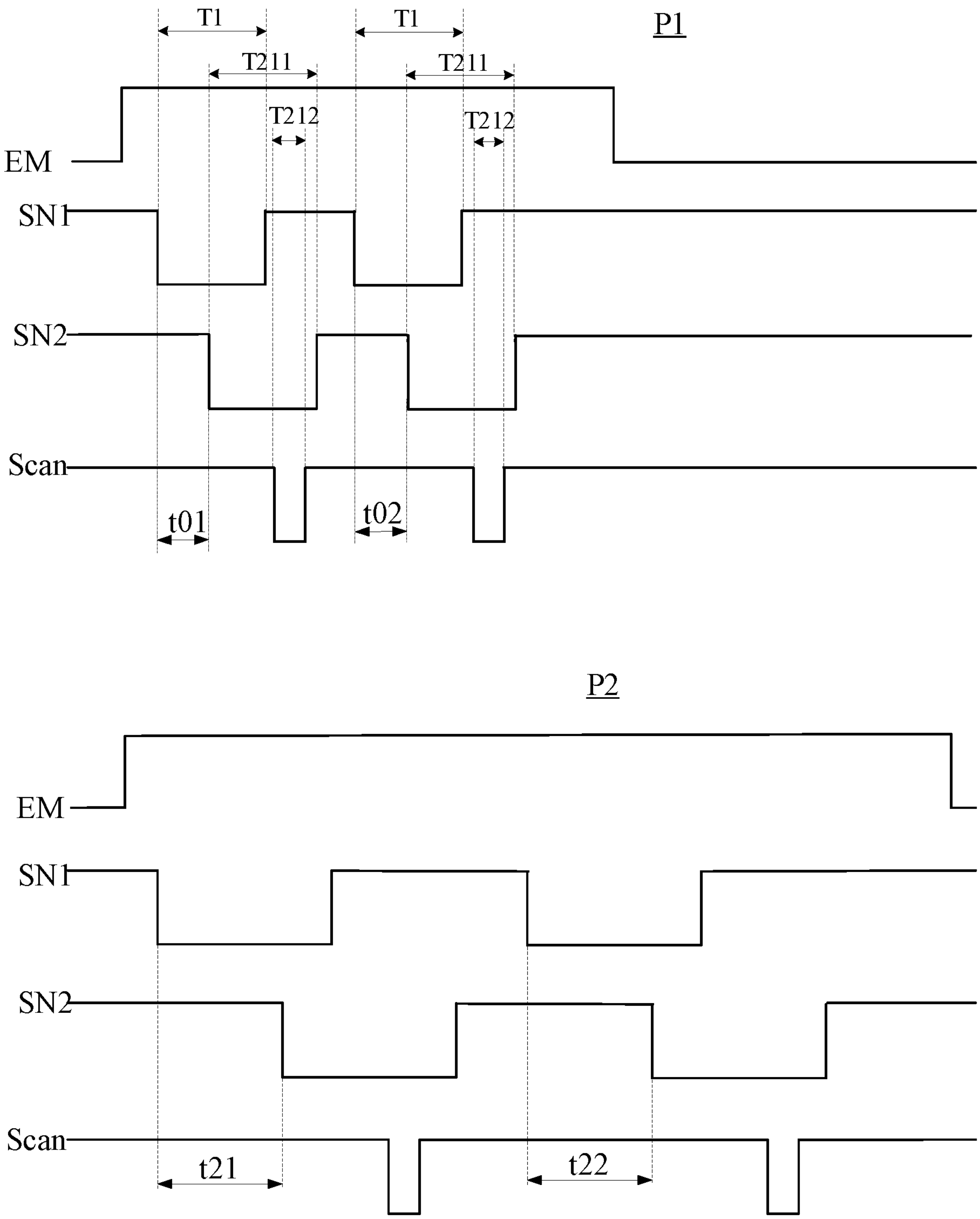
FIG. 10 is another timing comparison diagram under the first pulse period and the second pulse period.

FIG. 9 and FIG. 10 are respective timing comparison diagrams under the first pulse period and the second pulse period, where FIG. 9 and FIG. 10 respectively correspond to the cases non-overlap and overlap of the data writing stage T2 and the first reset stage T1.

In some embodiments, under the first pulse period P1 and the second pulse period P2, at least N times of the first reset stage T1 and at least N time of the data writing stage T2 may be performed. The start time of the $i^{th}$ data writing stage T2 may be located after the start time of the $i^{th}$ first reset stage T1, where 1<i<N, i being an integer and N being an integer greater than or equal to 2.

The embodiment of FIG. 9 shows a technical solution of perform three first reset stages T1 and three data writing stages T2 between two light-emitting stages, and the embodiment of FIG. 10 shows a technical solution of perform two first reset stages T1 and two data writing stages T2 between two light-emitting stages, however, the number of executions of the first reset stage T1 and the data writing stage T2 between two light-emitting stages are not limited in the embodiments of the present disclosure. In some other embodiments of the present disclosure, the number of executions of the first reset stage T1 and the data writing stage T2 between two light-emitting stages may also be more than three times, which is not limited in the embodiments of the present disclosure.

When the first reset stage T1 and the data writing stage T2 are introduced two more time between two light-emitting stages, the first reset stage T1 and the data writing stage T2 may be alternately performed. That is, the $i^{th}$ data writing stage T2 may be performed after the start time of the $i^{th}$ first reset stage T1, and the $i+i^{th}$ first reset stage T1 may be performed after the $i^{th}$ data writing stage T2. In the embodiments of the present disclosure, at least two first reset stages T1 and data writing stages T2 can be introduced before the light-emitting stage T3, and reset and data written can be performed on the gates of the driving transistors multiple times. In this way, the characteristics of the driving transistor can be better recovered before the light-emitting stage T3, which can better improve the brightness of the first frame, avoid or reduce the low brightness of the first frame when the screen is switched, which is beneficial to reduce the difference between the brightness of the first frame and the brightness of other subsequent frames, thereby effectively improving the smear phenomenon, and improving the display quality of the display panel. At the same time, by extending the interval between the start time of the first reset stage T1 and the start time of the data writing stage T2 with the low duty cycle, the time for threshold compensation and characteristic recovery of the driving transistor can be extended, thereby improving the display smear phenomenon under different pulse periods and improving the display effect. The threshold recovery of the driving transistor when the first reset stage and the data writing stage are introduced for multiple times will be described below with reference to FIG. 11.

Figure 11:
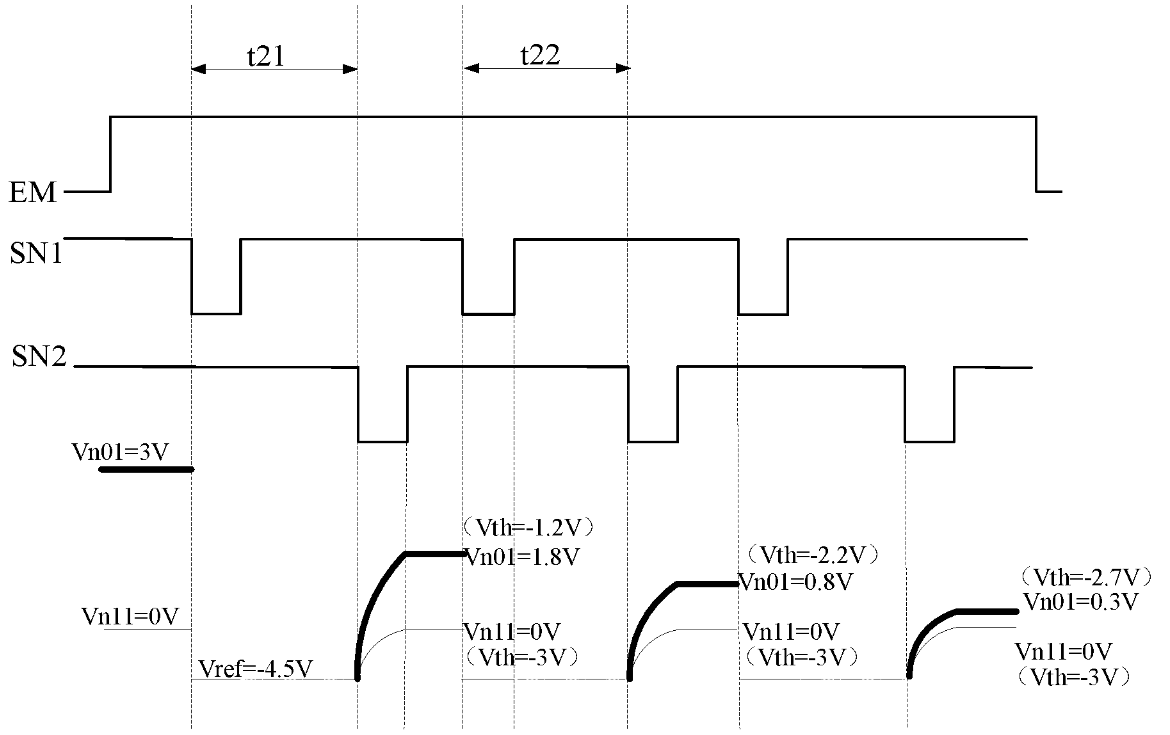
FIG. 11 is a schematic diagram showing a potential change of a first node after three first reset stages and three data writing stages.

FIG. 11 is a schematic diagram showing the voltage change of the first node after three first reset stages and three data writing stages, where Vn01 represents the voltage of the first node N1 when the black screen is switched to the white scree, and Vn11 represents the voltage of the first node N1 when the white screen is switched to the white screen. Ideally, the first node N1 voltage is equal to the difference between the voltage provided by the data signal terminal and the absolute value of the threshold voltage of the driving transistor, that is, Vdata-|Vth|. Assume Vdata=3V, when the black screen is switched to the white screen, after the first first reset stage T1, the voltage of the first node N1 becomes −4.5V, and after a data writing stage, the threshold voltage Vth of the driving transistor becomes −1.2V, at this time, the voltage Vn01 of the first node N1 becomes 1.8V. After the second first reset stage and the second data writing stage, the threshold voltage Vth of the driving transistor becomes −2.2V, and the voltage of Vn01 of the first node N1 becomes 0.8V. After the third first reset stage and the second data writing stage, the threshold voltage Vth of the driving transistor becomes −2.7V (closer to the threshold voltage of the driving transistor (−3V) when the white screen switches to the white screen), and the voltage of Vn01 of the first node N1 becomes 0.3V (closer to the voltage of the first node N1 when the white screen is switched to the white screen). Therefore, after multiple resets and data-writing, the threshold voltage of the driving transistor is gradually recovering. When the black screen is switched to the white screen, the threshold voltage of the driving transistor is gradually approaching the threshold voltage when the white screen is switched to the white screen, and the voltage of the first node N1 is gradually approaching the voltage of the first node N1 when the white screen is switched to the white screen. That is, after performing the first node reset stage and data writing stage multiple times, the threshold voltage of the driving transistor is gradually recovered, such that the potential of the first node when switching from the black screen to the white screen is becoming consistent with the potential of the first node when switching from the white screen to the white screen, and the color of the white screen when switching from the black screen to the white screen is also becoming consistent with the color of the white screen when switching from the white screen to the white screen. Therefore, preforming the first reset stage and data writing stage multiple time is beneficial to improving the smear phenomenon during the screen switching process.

Refer to FIG. 9 and FIG. 10. In some embodiments, under the first pulse period P1, the time interval between the start time of the $m^{th}$ first reset stage T1 and the start time of the $m^{th}$ data writing stage T2 may be t01, and the time interval between the start time of the $m+1^{th}$ first reset stage T1 and the start time of the $m+1^{th}$ data writing stage T2 may be t02, where $1 \leq m < N$, and t01=t02. Under the second pulse period P2, the time interval between the start time of the $m^{th}$ first reset stage T1 and the start time of the $m^{th}$ data writing stage T2 may be t21, and the time interval between the start time of the $m+1^{th}$ first reset stage T1 and the start time of the $m+1^{th}$ data writing stage T2 may be t22, where t21=t22, and t21>t01.

In this embodiment, when the first reset stage T1 and the data writing stage T2 are introduced at least twice before the light-emitting stage T3, under the same pulse period, the time interval between the start time of each reset stage and the start time of each data writing stage may be set to be equal. This is equivalent to the same time for recovering the threshold value of the driving transistor in each reset stage and data writing stage. Considering that at least two first reset stages and at least two data writing stages may be implemented as shift registers, if the time interval between the start time of the first reset stage and the start time of the data writing stage is different, the difficulty in controlling the shift registers will increase, which is not beneficial for the multiplexing of the signals transmitted by the shift registers of different stages. Therefore, in the present disclosure, the time for recovering the threshold value of the driving transistor can be the same in each reset stage and data writing stage. In this way, reliable recovery of the threshold value of the driving transistor can be realized, the smear phenomenon can be improved, and the control difficulty of the shift registers can be reduced. In addition, for the second pulse period P2 with a relatively low duty cycle, the time interval between each first reset stage T1 and the data writing stage T2 may be greater than the time interval between each first reset stage T1 and data writing stage T2 under the first pulse period P1. In this way, the time before the light-emitting stage T3 can be fully utilized to compensate the threshold value of the driving transistor, which is beneficial to the recovery of the characteristics of the driving transistor.

Figure 12:
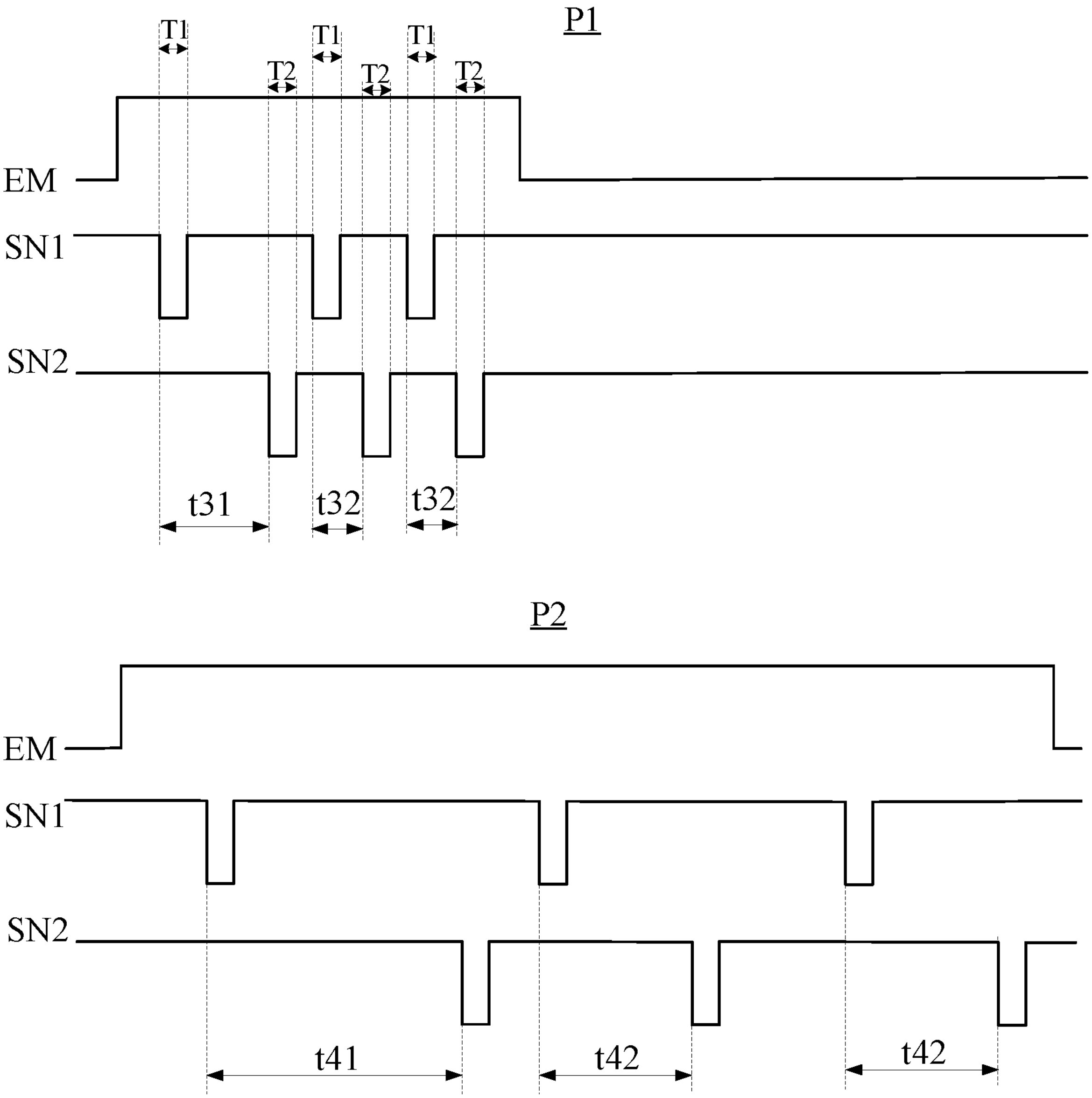
FIG. 12 is another timing comparison diagram under the first pulse period and the second pulse period.

FIG. 12 is another timing comparison diagram under the first pulse period P1 and the second pulse period P2. This embodiment shows a technical solution for differentiating the time interval between start times of the first reset stage T1 and the data writing stage T2 under the same pulse period.

Refer to FIG. 12. In some embodiments, under the first pulse period P1, the time interval between the start time of the first first reset stage T1 and the start time of the first data writing stage T2 may be t31, and the time interval between the start time of the $m^{th}$ first reset stage T1 and the start time of the $m^{th}$ data writing stage T2 may be t32, where $2 \leq m < N$, and t31>t32. Under the second pulse period P2, the time interval between the start time of the first first reset stage T1 and the start time of the first data writing stage T2 may be t41, and the time interval between the start time of the $m^{th}$ first reset stage T1 and the start time of the $m^{th}$ data writing stage T2 may be t42, where t41>t42≥t31.

During the display process of the display panel, in two adjacent data frames, after the display of the previous frame is completed, that is, at the time when the light-emitting stage of the previous frame is completed, the characteristic drift of the driving transistor can be relatively obvious. When multiple first reset stages T1 and data writing stages T2 are introduced before the light-emitting stage T3, for the same pulse period, in this embodiment, the time interval between the start time of the first first reset stage and the start time of the first data writing stage can be set to be greater than the time interval between the start time other first reset stages and the start time of other data writing stages, such that a longer characteristic recovery time can be reserved for the driving transistor to gradually recover the characteristic of the driving transistor. After the first first reset stage T1 and data writing stage T2, the characteristics of the driving transistor have achieved better recovery. After the first first reset stage T1 and data writing stage T2, other reset stages and data writing stages can be performed before the light-emitting stage, such that the characteristics of the driving transistor can be further recovered. Therefore, the time of the first reset stages T1 and the time of the data writing stages T2 after the first first reset stage T1 and data writing stage T2 can be appropriately reduced, and a better recovery of the characteristics of the driving transistor can also be achieved. The threshold value of the driving transistor when the time interval between different first reset stages and data writing stages will be further described below with reference to FIG. 13.

Figure 13:
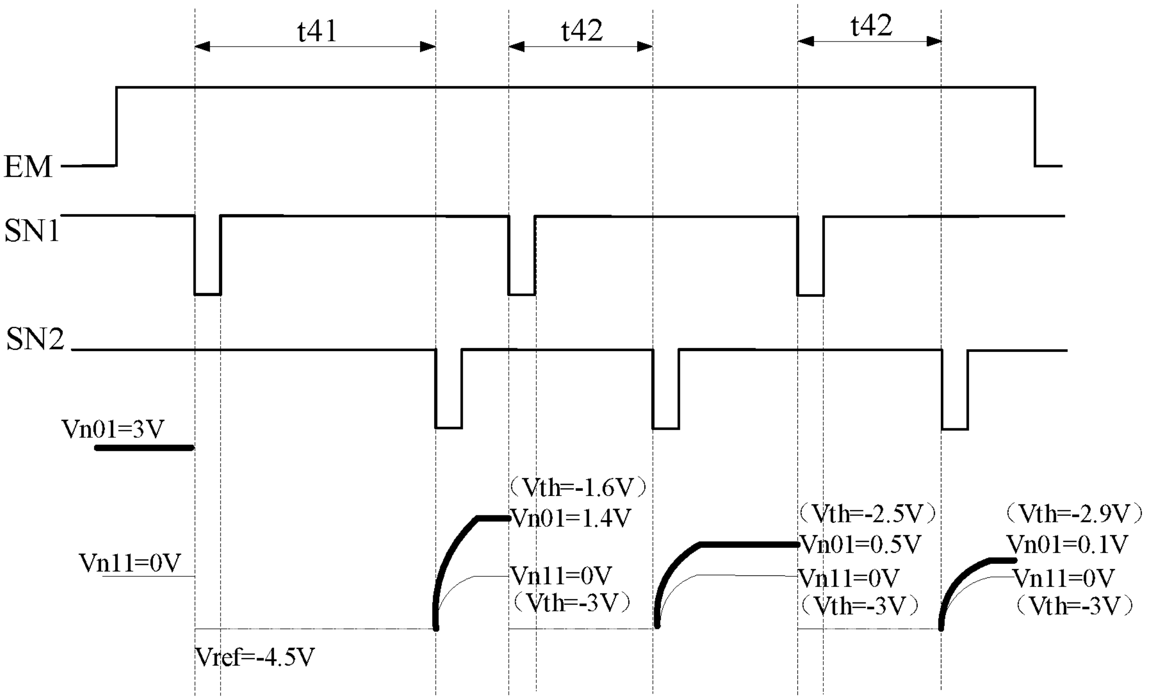
FIG. 13 is another schematic diagram showing the potential change of the first node after three first reset stages and three data writing stages.

FIG. 13 is another schematic diagram showing the potential change of the first node after three first reset stages and three data writing stages, where Vn01 represents the voltage of the first node N1 when the black screen is switched to the white scree, and Vn11 represents the voltage of the first node N1 when the white screen is switched to the white screen.

Ideally, the first node N1 voltage is equal to the difference between the voltage provided by the data signal terminal and the absolute value of the threshold voltage of the driving transistor, that is, Vdata-|Vth|. Assume Vdata=3V, when the black screen is switched to the white screen, after the first first reset stage T1, the voltage of the first node N1 becomes −4.5V. Since the time interval between the first reset stage and the data writing stage is relatively large, the driving transistor may be maintained for a longer period of time after resetting, which is beneficial to the recovery of the threshold value of the driving transistor. After the first data writing stage, the threshold value of Vth of the driving transistor becomes −1.6V, at this time, the voltage of the Vn01 of the first node N1 becomes 1.4V. Compared to the embodiment shown in FIG. 11, the threshold value recovery of the driving transistor in this embodiment is better after the first data writing stage is performed. After the second first reset stage and data writing stage are performed, the threshold value of the driving transistor is covered to −2.5V, and the voltage of the first node N1 becomes 0.5V. After the third first reset stage and data writing stage are performed, the threshold value of the driving transistor is covered to −2.9V, and the voltage of the first node N1 becomes 0.1V. At this time, the threshold voltage of the driving transistor is closer to the threshold voltage of the driving transistor when the white screen is switched to the white screen, and the potential of the first node is also closer to the potential of the first node when the white screen is switched to the white screen. Considering that the characteristic recovery of the driving transistor is not linear, but starts fast and slows down later, therefore, when the first reset stage and the data writing stage are performed multiple times, the time interval between the first reset stage and the data writing stage performed previously can be extended, which is beneficial to the recovery of the threshold value of the driving transistor, and the color of the screen formed by switching the black screen to the white screen can be closer to the color of the screen formed by switching the white screen to the white screen, which is beneficial to improving the smear phenomenon.

Figure 14:
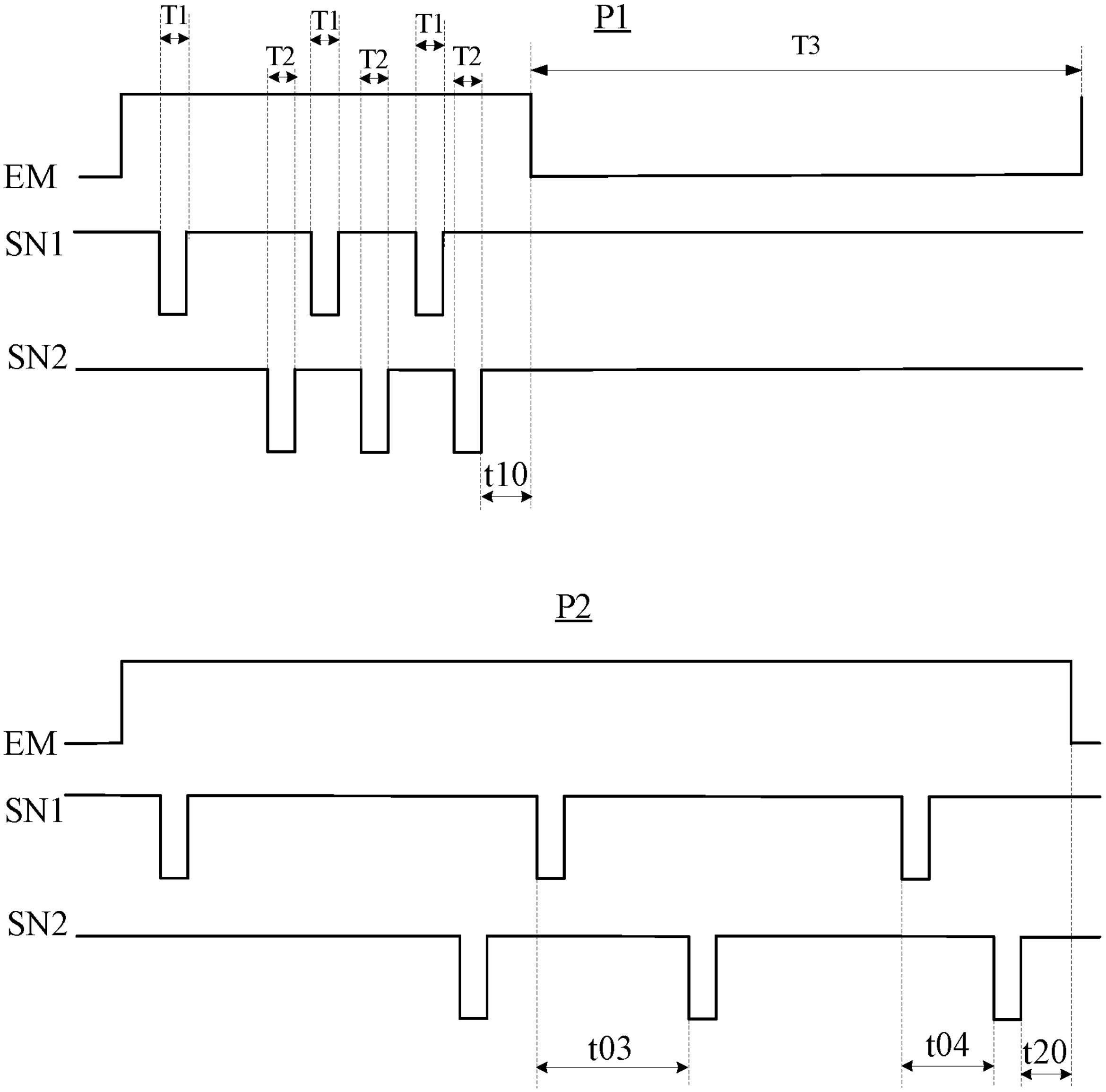
FIG. 14 is another timing comparison diagram under the first pulse period and the second pulse period.

The embodiments of FIG. 12 and FIG. 13 show a technical solution that, when the first reset stage T1 and the data writing stage T2 are introduced three times before the light-emitting stage T3, the time interval between the start time of the first first reset stage T1 and the start time of the first data writing stage T2 is the longest, and the time interval between the start time of the second first reset stage T1 and the start time of the second data writing stage T2 and the time interval between the start time of the third first reset stage T1 and the start time of the third data writing stage T2 are the same. In addition to this embodiment, as shown in FIG. 14, the time intervals between different first reset stages T1 and data writing stages T2 may also be set to be different. FIG. 14 is another timing comparison diagram under the first pulse period P1 and the second pulse period P2.

Refer to FIG. 14. In some embodiments, under the first pulse period P1 or the second pulse period P2, the time interval between the start time of the $P^{th}$ first reset stage T1 and the start time of the $P^{th}$ data writing stage T2 may be t03, and the time interval between the start time of the $P+1^{th}$ first reset stage T1 and the start time of the $P+1^{th}$ data writing stage T04 may be t02, where $1 \leq P < N$, and t03>t04. FIG. 14 only takes the time interval between the start time of the second first reset stage and the start time of the second data writing stage under the second pulse period as t03, and the interval between the start time of the third first reset stage and the start time of the third data writing stage under the second pulse period as t04 as an example, but the time interval between the start time of each first reset stage and data writing stage is not specifically limited in the embodiments of the present disclosure.

In this embodiment, the time interval between the start time of each first reset stage T1 and the start time of each data writing stage T2 may be different from each other. More specifically, the time interval between the start time of the first first reset stage T1 and the start time of the first data writing stage T2 may be the largest. For the second time on, the time interval between the start time of the first reset stage T1 and the start time of the data writing stage T2 may gradually decrease. When the light-emitting stage T3 of the previous frame is completed, the characteristic drift of the driving transistor is relatively obvious, and the threshold compensation of the driving transistor can be performed through the first reset stage with a longer duration, which is beneficial for the consistent recovery of the characteristics of the driving transistor. Each time the first reset stage T1 is performed, the characteristics of the driving transistor will tend to recover from the initial characteristics. After recovering the characteristics of the driving transistor to a certain extent in the first first reset stage, one or more subsequent first reset stages with shorter durations may be performed, which can better recover the characteristics of the driving transistor.

Figure 15:
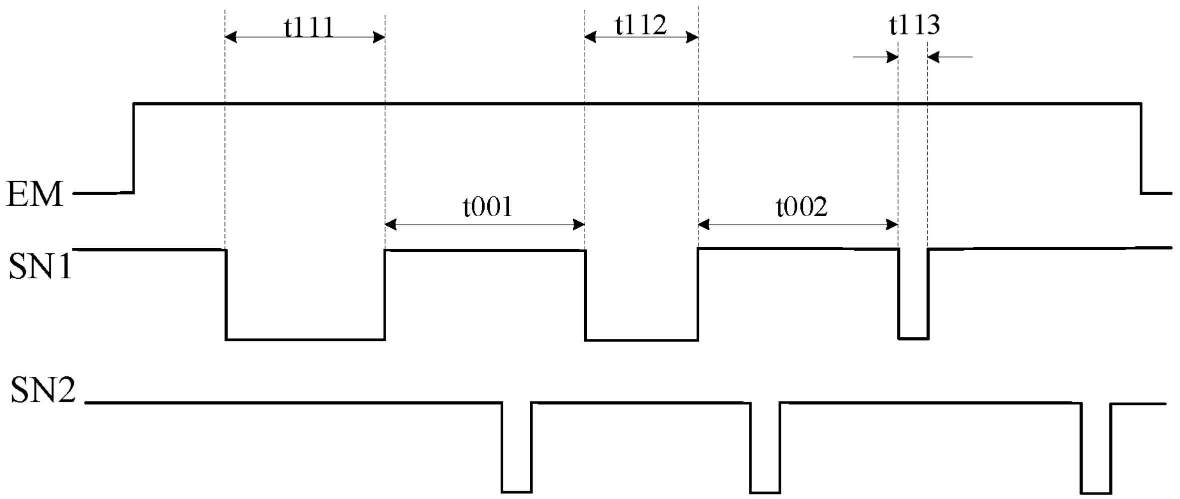
FIG. 15 is a timing diagram under the first pulse period or the second pulse period.

FIG. 15 is a timing diagram under the first pulse period P1 or the second pulse period P2. In some embodiments, under the first pulse period P1 or the second pulse period P2, the effective pulse widths of N first reset stages T1 may have an increasing trend or a decreasing trend, and the width of the effective pulse between two adjacent effective pulses may be the same.

The embodiment shown in FIG. 15 shows different technical solutions with different effective pulse widths of different first reset stages T1 under the same pulse period. Specifically, the effective pulse width of the first reset stage in the same pulse period having a decreasing trend is taken as an example for illustration. As shown in FIG. 15, the effective pulse width t111 of the first first reset stage is greater than the effective pulse width t112 of the second first reset stage, and the effective pulse width t112 of the second first reset stage is greater than the effective pulse width t113 of the third first reset stage. The ineffective pulse widths between two adjacent first reset stages are t001 and t002, respectively, and t001=t002. The first reset stage T1 may be a stage in which a reset signal is written to the gate of the driving transistor. When the reset signal is written to the gate of the driving transistor, the threshold value of the driving transistor may be compensated. Within a certain time range, the longer the reset signal is written to the driving transistor, the better the recovery of the characteristics of the driving transistor. When the light-emitting stage of the previous frame is completed, the characteristic shift of the driving transistor is obvious, and the threshold compensation of the driving transistor can be performed through the first reset stage with a longer period of time, which is beneficial to the continuous recovery of the characteristics of the driving transistor. Of course, after the first reset stage and before the light-emitting stage, even if no reset signal is written to the gate of the driving transistor, the driving transistor may perform characteristic recovery to a certain extent during this period. It should be noted that when the effective pulse width of the first reset stage T1 under the same pulse period is design differently, the time interval between the start time of the first reset stage T1 and the start time of the data writing stage T2 in the pulse period with the low duty cycle may be greater than the time interval between the start time of the first reset stage T1 and the start time of the data writing stage T2 in the pulse period with a high duty cycle. In this way, the time before the light-emitting stage T3 in the pulse period with the low duty cycle can still be better utilized to achieve the recovery of the characteristics of the driving transistor.

Figure 16:
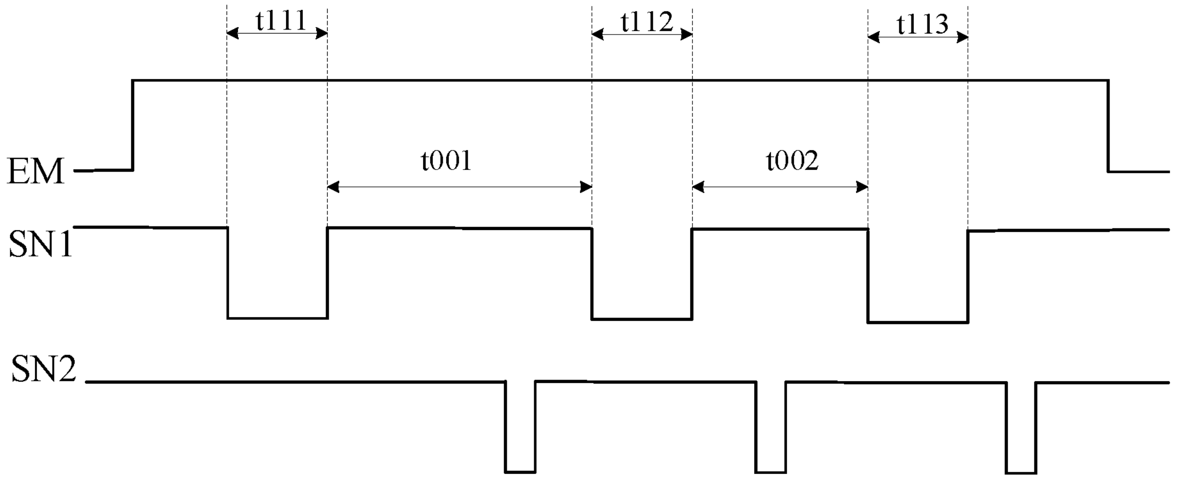
FIG. 16 is another timing diagram under the first pulse period or the second pulse period.

FIG. 16 is a timing diagram under the first pulse period P1 or the second pulse period P2. This embodiment shows a technical solution in which the effective pulse widths of multiple first reset stages T1 under the same pulse period are the same. Refer to FIG. 16. In some embodiments, under the first pulse period P1 or the second pulse period P2, the effective pulse widths of N first reset stages may be the same, and the width of effective pulses between two adjacent effective pulses may be in a increasing trend or a decreasing trend.

The embodiment shown in FIG. 16 shows a technical solution in which three first reset stages and data writing stages are introduced before the light-emitting stage, the widths of the effective pulses corresponding to the three first reset stages are set to be the same, that is, t111=t112=t113, and the width of the ineffective pulses between the effective pulses corresponding to the adjacent first reset stages are set to be different. More specifically, the width of the ineffective pulse showing a decreasing trend, that is, t001<t002, is taken as an example for illustration. When the widths of the effective pulses corresponding to the multiple first reset stages before the light-emitting stage are the same, the duration of each time the first reset stage writes the reset signal to the gate of the driving transistor may be fixed. By changing the width of the ineffective pulses between the effective pulses, the time interval between the start time of the first reset stage and the start time of the data writing stage can be adjusted in different times of the first reset stage and the data writing stage. When the width of the ineffective pulses decreases, the time interval between the start time of the first reset stage and the start time of the data writing stage may show an increasing trend. In this way, the characteristic of the driving transistor can be sufficiently recovered by using the time between the start time of the first reset stage and the start time of the data writing stage performed first, and the characteristic of the driving transistor can be further recovered by using the time between the start time of the first reset stage and the start time of the data writing stage performed subsequently. In this way, the driving transistor can be recovered to a better state before the light-emitting stage, and the smear phenomenon of the display panel can be effectively avoided.

In some other embodiments of the present disclosure, when the effective pulse widths of the multiple first reset stages before the light-emitting stage are the same, the width of the ineffective pulses between the effective pulses may also be set as an increasing trend. Correspondingly, in different first reset stages and data writing stages, the duration between the start time of the previous first reset stage and the start time of the previous data writing stage may be less than the duration between the start time of the subsequent first reset stage and the start time of the subsequent data writing stage, which can also recover the characteristics of the driving transistor.

Refer to FIG. 14. In some embodiments, under the first pulse period P1, the time interval between the end time of the last executed data writing stage T2 and the start time of the light-emitting stage T3 may be t10; and under the second pulse period P2, the time interval between the end time of the last executed data writing stage T2 and the start time of the light-emitting stage T3 may be t20, where t10=t20.

More specifically, when the duty cycles corresponding to different pulse periods are different, the present disclosure provides a differentiated design for the time interval between the start time of the first reset stage T1 and the start time of the data writing stage T2. The time interval between the start time of the first reset stage T1 and the start time of the data writing stage T2 under the second pulse period P2 with a low duty cycle may be set to be larger, thereby extending the characteristic recovery time of the driving transistor under the second pulse period P2 with the low duty cycle. For pulse periods of different duty cycles, the time interval between the end time of the data writing stage T2 adjacent to the light-emitting stage T3 and the start time of the light-emitting stage T3 may be set to be the same. In this way, the time interval from the last data writing before the completion of the light-emitting stage T3 to start of light-emitting stage can be the same under the pulse periods with different duty cycles, which is beneficial to improving the consistency of lighting conditions under pulse periods of different duty cycles.

Refer to FIG. 14. In some embodiments, t10 may be greater than or equal to 2H, where H is the time required to scan a row of sub-pixels in the display panel. When the time interval between the end time of the last executed data writing stage T2 and the start time of the light-emitting stage T3 is set to be greater than or equal to 2H under pulse periods of different duty cycles, a sufficient margin between the data writing stage and the light-emitting stage may be arranged. In this way, the burn-in phenomenon caused by the large current on the first power supply line passing through the driving transistor when the effective pulse in the data writing stage T2 and the light-emitting stage T3 occurs (the data writing stage T2 may overlap with the light-emitting stage T3) can be effectively avoided.

In some embodiments, between two light-emitting stages T3, the time interval between the start time of the first reset stage T1 executed for the first time and the end time of the light-emitting stage T3 adjacent to the first reset stage T1 may be greater than or equal to 2H, which can leave a sufficient margin between the light-emitting stage and the first reset stage. In this way, the burn-in phenomenon caused by the large current on the first power supply signal passing through the driving transistor when the effective pulse in the light-emitting stage T3 occurs (when the first reset stage T1 overlaps with the light-emitting stage T3) in the first reset stage T1 can be avoided.

Figure 17:
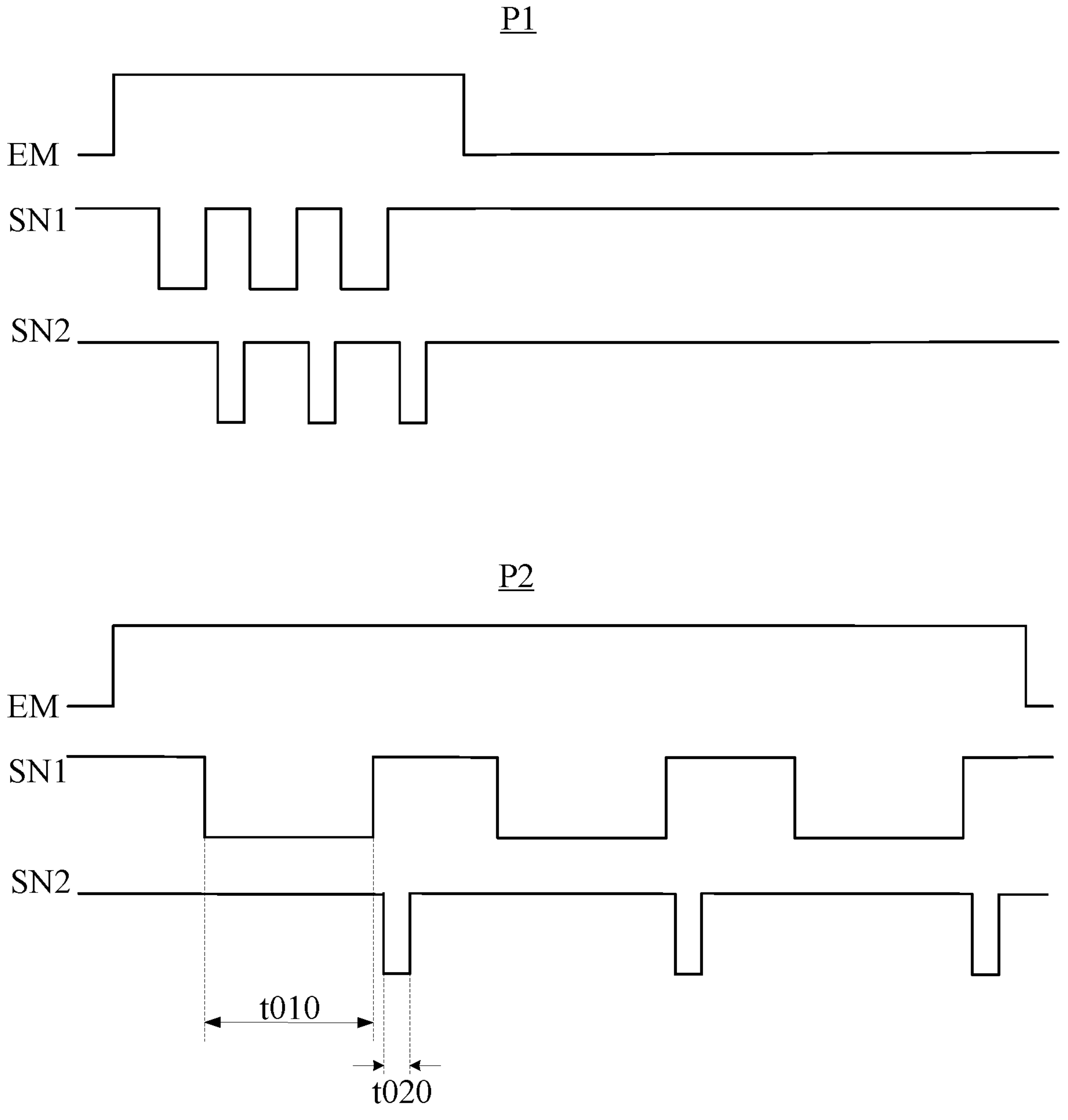
FIG. 17 is another timing comparison diagram under the first pulse period and the second pulse period.

FIG. 17 is another timing comparison diagram under the first pulse period P1 and the second pulse period P2. This embodiment illustrates a technical solution in which the effective pulse width of a single first reset stage T1 is larger than the effective pulse width of a single data writing stage T2 under the same pulse period.

Refer to FIG. 17. In some embodiments, at least under the second pulse period P2, a width t010 of an effective pulse of a single first reset stage T1 may be greater than a width t020 of an effective pulse of a single data writing stage T2. When the effective pulse width of a single first reset stage T1 is greater than the effective pulse width of a single data writing stage T2, it is equivalent to the time for resetting the gate of the driving transistor is greater than the time for writing data, which is beneficial to extending the characteristic recovery time of the driving transistor, such that the characteristics of the driving transistor before the light-emitting stage T3 can be better recovered.

Refer to FIG. 17. In some embodiments, under the first pulse period P1 and the second pulse period P2, the width t010 of an effective pulse of a single first reset stage T1 may be greater than or equal to 2H, where H is the time required to scan a row of sub-pixels in the display panel. When the width of the effective pulse of a single first reset stage T1 is set to be greater than 2H, the time to reset the gate of the driving transistor once, that is, the time for the driving transistor to recover its characteristics, may be greater than or equal to the time required to scan two rows of sub-pixels in the display panel, which is equivalent to effectively extending the characteristic recovery time of the driving transistor, which is more beneficial to the recovery of the characteristics of the driving transistor before the next light-emitting stage T3, and weakens or avoids the display smear phenomenon that occurs when the characteristics of the driving transistor are not well-recovered.

Figure 18:
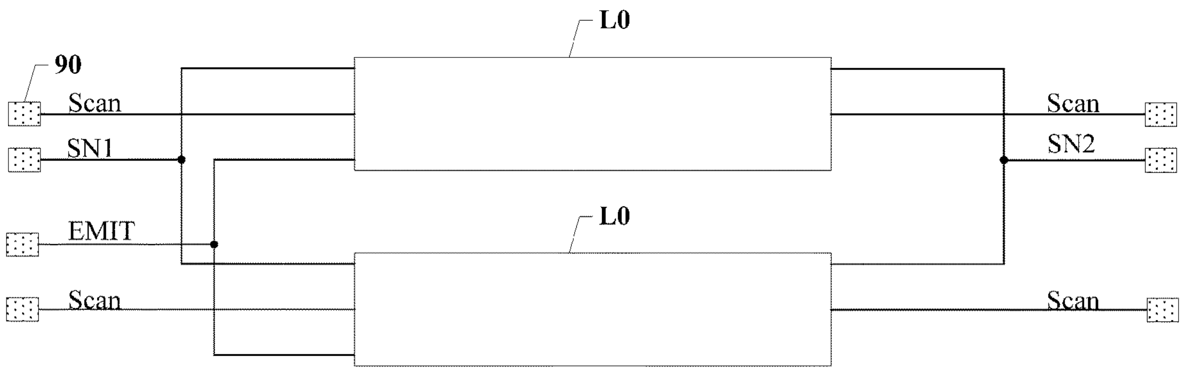
FIG. 18 is a diagram showing a correspondence between control lines and pixel rows in the display panel.

FIG. 18 is a diagram showing a correspondence between control lines and pixel rows in the display panel. The sub-pixel rows L0 shown in FIG. 18 is for illustration only, in fact, each sub-pixel row L0 may correspond to multiple pixel driving circuits. FIG. 18 shows the connection relationship between the control line the two sub-pixels rows L0. Refer to FIG. 7, FIG. 8, and FIG. 18. In some embodiments, the pixel driving circuits corresponding to at least two sub-pixel rows in the display panel may share the same first reset stage T1. That is, the same first reset module 30 may be used to reset the gates of the driving transistors in the pixel driving circuits corresponding to at least two sub-pixel rows L0, which is beneficial to simplify the driving sequence of the display panel, reduce the number of shift registers connected to the control lines, and further facilitate the realization of the narrow frame design of the display panel.

Refer to FIG. 7 and FIG. 18. In some embodiments, at least one of the first control line SN1, the second control signal line SN2, and a light-emitting control line EMIT may be respectively electrically connected to the pixel driving circuits corresponding to the light-emitting elements in the N sub-pixel rows, where N≥2; and a third control line Scan may only be electrically connected to the pixel driving circuits corresponding to the light-emitting elements in the same sub-pixel row L0. It should be noted that FIG. 18 only takes the first control line SN1, the second control signal line SN2, and the light-emitting control line EMIT being respectively electrically connected to the pixel driving circuits corresponding to the light-emitting elements in two pixel rows as an example. That is, one of the above control lines may drive two pixel rows. In some other embodiments of the present disclosure, one of the above control lines may drive three or more pixel rows, which is not limited in the embodiments of the present disclosure. Refer to FIG. 18. The same shift register 90 is connected to the first reset module 30 in the pixel driving circuits of the two sub-pixel rows L0, and the first node N1 of the pixel driving circuits in the two sub-pixel rows L0 may be reset through the control of the first control lines SN1. The same shift register 90 is connected to the compensation module 20 in the pixel driving circuits of the two sub-pixel rows L0, and the threshold compensation in the pixel driving circuits corresponding to the two sub-pixel rows L0 may be realized through the control of the second control signal lines SN2. Similarly, the same shift register 90 is connected to the light-emitting control module 40 in the pixel driving circuits of the two sub-pixel rows L0, and the control of the light-emitting stage T3 corresponding to the two sub-pixel rows L0 may be realized through the control of the light-emitting control signal lines EM. In this way, it is equivalent to using the same shift register 90 to provide signals to the pixel driving circuits in the two sub-pixel rows L0. Compared to the technical solution in which one shift register 90 only corresponds to the pixel driving circuit in one sub-pixel row L0, the number of shift registers 90 included in the display panel is greatly reduced. Since the space occupied by the shift register 90 is in the frame area of the display panel is reduced, a narrow frame design of the display panel can be realized.

Figure 19:
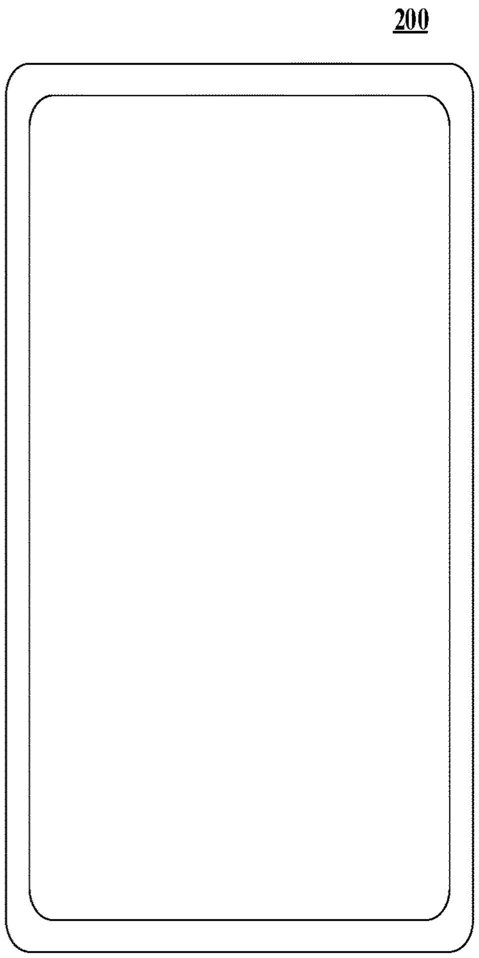
FIG. 19 is a schematic structural diagram of a display device according to an embodiment of the present disclosure.

Based on the same concept, an embodiment of the present disclosure further provides a display panel. FIG. 19 is a schematic structural diagram of a display device according to an embodiment of the present disclosure, and the display device may be driven by the display panel driving method provided in any of the foregoing embodiments. In the display panel driving method provided in any of the foregoing embodiments, the duration between the first reset stage and the data writing stage under the second pulse period with a low duty cycle may be extended. Since the time period between the start time of the first reset stage and the start time of the data writing stage is the process of resetting the gate of the driving transistor, that is, the process of threshold compensation and characteristic recovery of the driving transistor. When this time period is extended, it is equivalent to extending the characteristics recovery time of the driving transistor. The longer the threshold compensation time is, the more beneficial it is to recover the characteristics of the driving transistor to the initial state, thereby improving the smear phenomenon caused by the failure of a complete characteristic recovery of the driving transistor, and improving the overall display effect of the display panel. Consistent with the present disclosure, the time for the characteristic recovery of the driving transistor can be adjusted under different pulse periods based on different duty cycles, which is beneficial to improve the overall display effect of the display panel under different duty cycles.

The display panel provided in the in the embodiments of the present disclosure may be a display panel using an organic light-emitting diode display technology, that is, an OLDE display panel. The basic structure of the light-emitting layer of an OLED display panel generally includes an anode, a light-emitting material layer, and cathode. When the power source supplies a suitable voltage, the cavities in the anode and the electrons of the cathode combine in the light-emitting material layer to produce light. Compared with the thin-film effect liquid crystal displays, OLED display devices have the characteristics of high visibility, high brightness, better power consumption, light in weight, and thin in thickness. Of course, in some other embodiments of the present disclosure, the display panel may also be a display panel using inorganic light-emitting diode display technology, such as a micro-LED display panel, a mini-LED display panel, etc.

It should be understood that the display panel provided by the embodiments of the present disclosure can be applied to other display devices with display functions, such as computers, mobile phones, and tablets, which are not limited in the embodiments of the present disclosure. The display panel provided by the embodiments of the present disclosure has the beneficial effects of the display panel driving method provided in the foregoing embodiments. For details, reference can be made to the specific description of the display panel in the foregoing embodiments, which will not be repeated here.

Consistent with the present disclosure, the display panel driving method and the display panel provided by the embodiments of the present disclosure at least achieve the following beneficial effects. In the display panel driving method and the display panel provided by the embodiments of the present disclosure, the working stages of the pixel driving circuit may include the first reset stage, the data writing stage, and the light-emitting stage. The first reset stage may be used to reset the driving transistor in the pixel driving circuit. The display panel may include two pulse periods with different duty cycles. The first duty cycle corresponding to the first pulse period may be greater than the second duty cycle corresponding to the second pulse period. At this time, the time interval t2 between the start time of the first reset stage and the start time of the data writing stage under the second pulse period may be set to be greater than the time interval t1 between the start time of the first reset stage and the start time of the data writing stage under the first pulse period, which is equivalent to extending the time period between the first reset stage and the data writing stage under the second pulse period with the low duty cycle. Since the time period between the start time of the first reset stage and the start time of the data writing stage is the process of resetting the gate of the driving transistor, that is, the process of threshold compensation and characteristic recovery of the driving transistor. When this time period is extended, it is equivalent to extending the characteristics recovery time of the driving transistor. The longer the threshold compensation time is, the more beneficial it is to recover the characteristics of the driving transistor to the initial state, thereby improving the smear phenomenon caused by the failure of a complete characteristic recovery of the driving transistor, and improving the overall display effect of the display panel, which is beneficial to improving the overall display effect of the display panel.

Although some specific embodiments of the present disclosure are described by examples in detail, those skilled in the art should understand that the above examples are only schematic and are not intended to limit the scope of the present disclosure. Those skilled in the art should understand that the above embodiments may be modified without deviating from the scope and spirit of the present disclosure. The scope of the disclosure is defined by the attached claims.

What is claimed is:

1. A display panel driving method, the display panel including a plurality of sub-pixels and a plurality of pixel driving circuits correspondingly connected to the plurality of sub-pixels, the pixel driving circuit including a driving transistor, working stages of the pixel driving circuit including a first reset stage, a data writing stage, and a light-emitting stage, a start time of the data writing stage being located after a start time of the first reset stage and before a start time of the light-emitting stage, the first reset stage being used for at least resetting a gate of the driving transistor, wherein:

the display panel includes a first pulse width modulation period and a second pulse width modulation period, in the first pulse width modulation period, a duty cycle of a light-emitting control signal in the light-emitting stage being referred to as a first duty cycle; in the second pulse width modulation period, the duty cycle of the light-emitting control signal in the light-emitting stage being referred to as a second duty cycle, the first duty cycle being greater than the second duty cycle, wherein:

in the first pulse width modulation period, a time interval between the start time of the first reset stage and the start time of the data writing stage is t1; in the second pulse width modulation period, the time interval between the start time of the first reset stage and the start time of the data writing stage is t2, t1<t2, so that the time interval between the start time of the first reset stage and the start time of the data writing stage is set according to a duty cycle of the light-emitting stage of a light-emitting stage signal when duty cycles of the light-emitting stage of light-emitting stage signals received by the driving transistor are different.

2. The display panel driving method of claim 1, wherein:

in the first pulse width modulation period, an effective pulse width corresponding to a single first reset stage is t11; and in the second pulse width modulation period, the effective pulse width corresponding to a single first reset stage is t12, t11<t12.

3. The display panel driving method of claim 1, wherein:

the data writing stage includes a compensation stage and a data input stage, the compensation stage and the data input stage being performed simultaneously, and the start time of the data writing stage being located after an end time of the first reset stage.

4. The display panel driving method of claim 3, wherein:

the pixel driving circuit includes a data writing module and a compensation module, the data writing module being connected with a first electrode of the driving transistor, the compensation module being connected between a second electrode and the gate of the driving transistor, the data writing module and the compensation module being turned on at the same time in the data writing stage.

5. The display panel driving method of claim 1, wherein:

the data writing stage includes a first sub-stage and a second sub-stage, the first sub-stage being used for at least resetting the second electrode of the driving transistor, the second sub-stage being used for at least compensating a gate potential of the driving transistor, a start time of the first sub-stage being located between the start time and the end time of the first reset stage, and an end time of the first sub-stage being located after the end time of the first reset stage, the second sub-stage being located between the start time and the end time of the first reset stage, and located after the end time of the first reset stage.

6. The display panel driving method of claim 5, wherein:

the pixel driving circuit includes a data writing module and a compensation module, the data writing module being connected with a first electrode of the driving transistor, the compensation module being connected between a second electrode and the gate of the driving transistor, control terminals of the data writing module and the compensation module being respectively connected to different control signal terminals, the compensation module being turned on in both the first sub-stage and the second sub-stage, the data writing module being turned on in the second sub-stage.

7. The display panel driving method of claim 1, wherein:

in the first pulse width modulation period and the second pulse width modulation period, at least N first reset stages and N data writing stages are performed, the start time of an $i^{th}$ data writing stage being located after the start time of the $i^{th}$ first reset stage, $1 \leq i \leq N$, i being an integer, N being an integer greater than or equal to 2.

8. The display panel of driving method claim 7, wherein:

in the first pulse width modulation period, the time interval between the start time of a $m^{th}$ first reset stage and the start time of the $m^{th}$ data writing stage is t01, the time interval between the start time of a $m+1^{th}$ first reset stage and the start time of the m+1$^{th}$ data writing stage is t02, 1≤m<N, t01=t02; and in the second pulse width modulation period, the time interval between the start time of the m$^{th}$ first reset stage and the start time of the m$^{th}$ data writing stage is t21, the time interval between the start time of a m+1$^{th}$ first reset stage and the start time of the m+1$^{th}$ data writing stage is t22, t21=t22, t21>t01.

9. The display panel driving method of claim 7, wherein:

in the first pulse width modulation period, the time interval between the start time of a first first reset stage and the start time of a first data writing stage is t31, the time interval between the start time of a M$^{th}$ first reset stage and the start time of the M$^{th}$ data writing stage is t32, 2≤M≤N, t31>t32; and in the second pulse width modulation period, the time interval between the start time of the first first reset stage and the start time of the first data writing stage is t41, the time interval between the start time of the M$^{th}$ first reset stage and the start time of the M$^{th}$ data writing stage is t42, t41>t42≥t31.

10. The display panel driving method of claim 7, wherein:

in the first pulse width modulation period or the second pulse width modulation period, the time interval between the start time of a P$^{th}$ first reset stage and the start time of the P$^{th}$ data writing stage is t03, the time interval between the start time of a P+1$^{th}$ first reset stage and the start time of the P+1$^{th}$ data writing stage is t04, 1≤P<N, t03>t04.

11. The display panel driving method of claim 7, wherein:

in the first pulse width modulation period or the second pulse width modulation period, the effective pulse widths of N first reset stages are showing an increasing or a decreasing trend, and the widths of ineffective pulses between two adjacent effective pulses are the same.

12. The display panel driving method of claim 7, wherein:

in the first pulse width modulation period or the second pulse width modulation period, the effective pulse widths of N first reset stages are the same, and the widths of the ineffective pulses between two adjacent effective pulses are showing an increasing or a decreasing trend.

13. The display panel driving method of claim 1, wherein:

in the first pulse width modulation period, the time interval between an end time of a last data writing stage and the start time of the light-emitting stage is t10; in the second pulse width modulation period, the time interval between the end time of the last data writing stage and the start time of the light-emitting stage is t20, t10=t20.

14. The display panel driving method of claim 13, wherein:

t10 is greater than or equal to 2H, H being a time required to scan a row of sub-pixels in the display panel.

15. The display panel driving method of claim 1, wherein:

at least in the second pulse width modulation period, the width of one effective pulse of the first reset stage is greater than the width of one effective pulse of the data writing stage.

16. The display panel driving method of claim 1, wherein:

in the first pulse width modulation period and the second pulse width modulation period, the width of one effective pulse in the first reset stage is greater than or equal to 2H, H being a time required to scan a row of sub-pixels in the display panel.

17. The display panel driving method of claim 16, wherein:

the pixel driving circuits corresponding to at least two rows of sub-pixels in the display panel share the same first reset stage.

18. A display panel comprising:

a plurality of sub-pixels and a plurality of pixel driving circuits correspondingly connected to the plurality of sub-pixels, the pixel driving circuit including a driving transistor, working stages of the pixel driving circuit including a first reset stage, a data writing stage, and a light-emitting stage, a start time of the data writing stage being located after a start time of the first reset stage and before a start time of the light-emitting stage, the first reset stage being used for at least resetting a gate of the driving transistor; and a first pulse width modulation period and a second pulse width modulation period, in the first pulse width modulation period, a duty cycle of a light-emitting control signal in the light-emitting stage being referred to as a first duty cycle; in the second pulse width modulation period, the duty cycle of the light-emitting control signal in the light-emitting stage being referred to as a second duty cycle, the first duty cycle being greater than the second duty cycle, wherein:

in the first pulse width modulation period, a time interval between the start time of the first reset stage and the start time of the data writing stage is t1; in the second pulse width modulation period, the time interval between the start time of the first reset stage and the start time of the data writing stage is t2, t1<t2, so that the time interval between the start time of the first reset stage and the start time of the data writing stage is set according to a duty cycle of the light-emitting stage of a light-emitting stage signal when duty cycles of the light-emitting stage of light-emitting stage signals received by the driving transistor are different.

19. The display panel of claim 18, wherein:

in the first pulse width modulation period and the second pulse width modulation period, at least N first reset stages and N data writing stages are performed, the start time of an i$^{th}$ data writing stage being located after the start time of the i$^{th}$ first reset stage, 1≤i≤N, i being an integer, N being an integer greater than or equal to 2.

20. The display panel of claim 18, wherein:

in the first pulse width modulation period, the time interval between an end time of a last data writing stage and the start time of the light-emitting stage is t10; in the second pulse width modulation period; and in the second pulse width modulation period, the time interval between the end time of the last data writing stage and the start time of the light-emitting stage is t20, t10=t20.

* * * * *